United States Patent
Welch et al.

(10) Patent No.: US 8,603,281 B2
(45) Date of Patent: *Dec. 10, 2013

(54) ELASTIC COMPOSITE CONTAINING A LOW STRENGTH AND LIGHTWEIGHT NONWOVEN FACING

(75) Inventors: Howard M. Welch, Woodstock, GA (US); James Austin, Johns Creek, GA (US); Lisa Sanabria, Alpharetta, GA (US); Jose A. Siqueira, Roswell, GA (US); Wing-Chak Ng, Suwanee, GA (US); Bryan D. Haynes, Cumming, GA (US); Oomman P. Thomas, Alpharetta, GA (US); Iris V. Schumacher, Atlanta, GA (US); Christopher Laslie, Cumming, GA (US); Stephen C. Meyer, Woodstock, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 1475 days.

This patent is subject to a terminal disclaimer.

(21) Appl. No.: 12/165,010

(22) Filed: Jun. 30, 2008

(65) Prior Publication Data

US 2009/0325448 A1 Dec. 31, 2009

(51) Int. Cl.
*D04H 1/56* (2006.01)
*D04H 3/16* (2006.01)

(52) U.S. Cl.
USPC ............. 156/244.11; 156/244.19; 442/394; 442/400; 442/401

(58) Field of Classification Search
USPC ........ 442/394, 400, 401; 156/244.11, 244.19, 156/260
See application file for complete search history.

(56) References Cited

U.S. PATENT DOCUMENTS

| 4,606,970 A | 8/1986 | Sharps, Jr. |
| 4,657,802 A | 4/1987 | Morman |

(Continued)

FOREIGN PATENT DOCUMENTS

| EP | 1316418 A1 | 6/2003 |
| EP | 1637639 A2 | 3/2006 |

(Continued)

OTHER PUBLICATIONS

Related U.S. Patent Applications Form.

(Continued)

*Primary Examiner* — Lynda Salvatore
(74) *Attorney, Agent, or Firm* — Dority & Manning, P.A.

(57) ABSTRACT

An elastic composite formed from a lightweight nonwoven facing that has a low degree of strength in the cross-machine direction ("CD") is provided. Through selective control over certain parameters of the materials employed in the composite and the formation process, the present inventors have discovered that such low strength and lightweight facings may be readily laminated to an elastic film without significantly damaging their integrity. For example, in one embodiment, the elastic film may possess a multi-layered construction that includes an elastomeric elastic layer positioned adjacent to a strength-enhancing thermoplastic layer. The polymer content and thickness of the thermoplastic layer are generally selected to impart additional strength and integrity to the film. Likewise, the polymer content of the elastic layer may also be selected so that the film possesses a sufficient tack for adhering to the facing. In certain cases, it may be desirable to position the layer between two elastic layers so that the strength-enhancing layer does not substantially contact the nonwoven facing. In this manner, the strength-enhancing layer may avoid substantial damage during the lamination process.

17 Claims, 6 Drawing Sheets

(56) References Cited

U.S. PATENT DOCUMENTS

| | | | |
|---|---|---|---|
| 4,663,220 A | 5/1987 | Wisneski et al. |
| 4,704,116 A | 11/1987 | Enloe |
| 4,720,415 A | 1/1988 | Vander Wielen et al. |
| 4,726,976 A | 2/1988 | Karami et al. |
| 4,834,738 A | 5/1989 | Kielpikowski et al. |
| 4,886,512 A | 12/1989 | Damico et al. |
| 4,965,122 A | 10/1990 | Morman |
| 4,981,747 A | 1/1991 | Morman |
| 4,981,750 A | 1/1991 | Murphy et al. |
| 5,093,422 A | 3/1992 | Himes |
| 5,169,706 A | 12/1992 | Collier, IV et al. |
| 5,192,606 A | 3/1993 | Proxmire et al. |
| 5,207,962 A | 5/1993 | Hovis et al. |
| 5,213,881 A | 5/1993 | Timmons et al. |
| 5,226,992 A | 7/1993 | Morman |
| 5,272,236 A | 12/1993 | Lai et al. |
| 5,278,272 A | 1/1994 | Lai et al. |
| 5,304,599 A | 4/1994 | Himes |
| 5,322,728 A | 6/1994 | Davey et al. |
| 5,332,613 A | 7/1994 | Taylor et al. |
| 5,334,446 A | 8/1994 | Quantrille et al. |
| 5,336,545 A | 8/1994 | Morman |
| 5,393,599 A | 2/1995 | Quantrille et al. |
| 5,413,849 A | 5/1995 | Austin et al. |
| 5,431,991 A | 7/1995 | Quantrille et al. |
| 5,470,639 A | 11/1995 | Gessner et al. |
| 5,472,775 A | 12/1995 | Obijeski et al. |
| 5,486,166 A | 1/1996 | Bishop et al. |
| 5,490,846 A | 2/1996 | Ellis et al. |
| 5,501,679 A | 3/1996 | Krueger et al. |
| 5,539,056 A | 7/1996 | Yang et al. |
| 5,540,796 A | 7/1996 | Fries |
| 5,543,206 A | 8/1996 | Austin et al. |
| 5,560,793 A | 10/1996 | Ruscher et al. |
| 5,567,501 A | 10/1996 | Srinivasan et al. |
| D375,844 S | 11/1996 | Edwards et al. |
| 5,571,619 A | 11/1996 | McAlpin et al. |
| 5,589,249 A | 12/1996 | Bodford et al. |
| 5,595,618 A | 1/1997 | Fries et al. |
| 5,596,052 A | 1/1997 | Resconi et al. |
| 5,620,779 A | 4/1997 | Levy et al. |
| 5,620,780 A | 4/1997 | Krueger et al. |
| 5,624,729 A | 4/1997 | Cohen et al. |
| 5,635,290 A | 6/1997 | Stopper et al. |
| 5,656,119 A | 8/1997 | Srinivasan et al. |
| 5,674,211 A | 10/1997 | Ekdahl |
| D390,708 S | 2/1998 | Brown |
| 5,714,107 A | 2/1998 | Levy et al. |
| 5,733,628 A | 3/1998 | Pelkie |
| 5,733,822 A | 3/1998 | Gessner et al. |
| 5,763,041 A | 6/1998 | Leak et al. |
| 5,804,286 A | 9/1998 | Quantrille et al. |
| 5,830,555 A | 11/1998 | Srinivasan et al. |
| 5,837,352 A | 11/1998 | English et al. |
| 5,865,926 A | 2/1999 | Wu et al. |
| 5,921,973 A | 7/1999 | Newkirk et al. |
| 5,931,823 A | 8/1999 | Stokes et al. |
| 5,932,497 A | 8/1999 | Morman et al. |
| 5,962,112 A | 10/1999 | Haynes et al. |
| 5,964,742 A | 10/1999 | McCormack et al. |
| 6,015,764 A | 1/2000 | McCormack et al. |
| 6,025,050 A | 2/2000 | Srinivasan et al. |
| 6,060,638 A | 5/2000 | Paul et al. |
| 6,075,179 A | 6/2000 | McCormack et al. |
| D428,267 S | 7/2000 | Romano, III et al. |
| 6,090,325 A | 7/2000 | Wheat et al. |
| 6,106,925 A | 8/2000 | Palumbo |
| 6,111,163 A | 8/2000 | McCormack et al. |
| 6,159,584 A | 12/2000 | Eaton et al. |
| 6,207,237 B1 | 3/2001 | Haffner |
| 6,231,948 B1 | 5/2001 | Ouellette et al. |
| 6,242,074 B1 | 6/2001 | Thomas |
| 6,303,208 B1 | 10/2001 | Pelkie |
| 6,315,864 B2 | 11/2001 | Anderson et al. |
| 6,461,457 B1 | 10/2002 | Taylor et al. |
| 6,461,716 B1 | 10/2002 | Lee et al. |
| 6,475,600 B1 | 11/2002 | Morman et al. |
| 6,479,154 B1 | 11/2002 | Walton et al. |
| 6,500,563 B1 | 12/2002 | Datta et al. |
| 6,503,598 B1 | 1/2003 | Goda et al. |
| 6,503,855 B1 | 1/2003 | Menzies et al. |
| 6,531,207 B1 | 3/2003 | Eaton et al. |
| 6,537,930 B1 | 3/2003 | Middlesworth et al. |
| 6,582,810 B2 | 6/2003 | Heffelfinger |
| 6,663,611 B2 | 12/2003 | Blaney et al. |
| 6,720,279 B2 | 4/2004 | Cree et al. |
| 6,726,983 B2 | 4/2004 | Erdos et al. |
| 6,764,566 B1 | 7/2004 | Griesbach, III et al. |
| 6,808,789 B2 | 10/2004 | Pelkie et al. |
| 6,824,734 B2 | 11/2004 | Boggs et al. |
| 6,830,800 B2 | 12/2004 | Curro et al. |
| 6,835,256 B2 | 12/2004 | Menzies et al. |
| 6,849,319 B2 | 2/2005 | Cree et al. |
| 6,878,433 B2 | 4/2005 | Curro et al. |
| 6,884,494 B1 | 4/2005 | Curro et al. |
| 6,893,707 B2 | 5/2005 | Keiser et al. |
| 6,982,231 B1 | 1/2006 | Uitenbroek et al. |
| 6,986,932 B2 | 1/2006 | Zink et al. |
| 7,008,496 B2 | 3/2006 | Morman |
| 7,014,631 B2 | 3/2006 | Jackson et al. |
| 7,037,569 B2 | 5/2006 | Curro et al. |
| 7,045,030 B2 | 5/2006 | Bevins, III et al. |
| 7,078,089 B2 | 7/2006 | Ellis et al. |
| 7,087,287 B2 | 8/2006 | Curro et al. |
| 7,141,132 B2 | 11/2006 | Shimakawa et al. |
| 7,247,675 B2 | 7/2007 | Thomas et al. |
| 7,312,167 B2 | 12/2007 | McCormack et al. |
| 7,320,948 B2 | 1/2008 | Morman et al. |
| 7,329,621 B2 | 2/2008 | Collier, IV et al. |
| 7,384,491 B2 | 6/2008 | Fitts, Jr. et al. |
| 7,422,712 B2 | 9/2008 | DeLucia et al. |
| 7,585,382 B2 | 9/2009 | Hughes et al. |
| 2004/0110442 A1 | 6/2004 | Rhim et al. |
| 2004/0121690 A1 | 6/2004 | Mleziva et al. |
| 2004/0122396 A1 | 6/2004 | Maldonado et al. |
| 2004/0261230 A1 | 12/2004 | Neeb et al. |
| 2005/0059941 A1 | 3/2005 | Baldwin et al. |
| 2005/0095943 A1 | 5/2005 | Griffin et al. |
| 2005/0106978 A1 | 5/2005 | Cheng et al. |
| 2005/0106980 A1 | 5/2005 | Abed et al. |
| 2005/0158513 A1 | 7/2005 | Peacock et al. |
| 2005/0244661 A1 | 11/2005 | Lee et al. |
| 2005/0245162 A1 | 11/2005 | McCormack et al. |
| 2006/0003658 A1 | 1/2006 | Hall et al. |
| 2006/0052023 A1 | 3/2006 | Lauridsen et al. |
| 2006/0135024 A1 | 6/2006 | Thomas et al. |
| 2006/0148354 A1 | 7/2006 | Shelley et al. |
| 2006/0148358 A1 | 7/2006 | Hall et al. |
| 2006/0148361 A1 | 7/2006 | Ng et al. |
| 2006/0151914 A1 | 7/2006 | Gerndt et al. |
| 2007/0092704 A1 | 4/2007 | Patel et al. |
| 2007/0141352 A1 | 6/2007 | Calhoun et al. |
| 2007/0141937 A1 | 6/2007 | Hendrix et al. |
| 2008/0095978 A1 | 4/2008 | Siqueira et al. |
| 2008/0132866 A1 | 6/2008 | Siqueira et al. |
| 2008/0221540 A1 | 9/2008 | Thomas et al. |
| 2009/0325447 A1* | 12/2009 | Austin et al. .......... 442/328 |

FOREIGN PATENT DOCUMENTS

| | | |
|---|---|---|
| EP | 1637639 A3 | 3/2006 |
| WO | WO 9423947 A1 | 10/1994 |
| WO | WO 9829504 A1 | 7/1998 |
| WO | WO 9914047 A1 | 3/1999 |
| WO | WO 0145616 A1 | 6/2001 |
| WO | WO 0187592 A1 | 11/2001 |
| WO | WO 03 007864 A1 | 1/2003 |
| WO | WO 2004060664 A1 | 7/2004 |
| WO | WO 2004060666 A1 | 7/2004 |
| WO | WO 2004060669 A1 | 7/2004 |
| WO | WO 2006024394 A1 | 3/2006 |
| WO | WO 2006062648 A2 | 6/2006 |
| WO | WO 2006062648 A3 | 6/2006 |
| WO | WO 2006071306 A1 | 7/2006 |

(56) References Cited

FOREIGN PATENT DOCUMENTS

| WO | WO 2006093615 A2 | 9/2006 |
|---|---|---|
| WO | WO 2006093615 A3 | 9/2006 |
| WO | WO 2006109341 A1 | 10/2006 |
| WO | WO 2008 064287 A1 | 5/2008 |

OTHER PUBLICATIONS

American Society for Testing Materials (ASTM) Designation: D1238-95 (aka D1238-E), "Standard Test Method for Flow Rates of Thermoplastics by Extrusion Plastometer," pp. 273-281, published Jan. 1996.

American Society for Testing Materials (ASTM) Designation: D1525-07, "Standard Test Method for Vicat Softening Temperature of Plastics," pp. 1-9, published Mar. 2007.

American Society for Testing Materials (ASTM) Designation: D5034-95, "Standard Test Method for Breaking Strength and Elongation of Textile Fabrics (Grab Test)," pp. 674-681, published Jul. 1995.

American Society for Testing Materials (ASTM) Designation: D5035-95, "Standard Test Method for Breaking Force and Elongation of Textile Fabrics (Strip Method)," pp. 682-688, published Jul. 1995.

Search Report and Written Opinion for PCT/IB2009/054024 dated Jan. 25, 2010, 14 pages.

Supplementary European Search Report dated Jun. 25, 2012, 7 pages.

Abstract of Japanese Patent No. JP2007084954, dated Apr. 5, 2007.

\* cited by examiner

ELASTIC COMPOSITE CONTAINING A LOW STRENGTH AND LIGHTWEIGHT NONWOVEN FACING

BACKGROUND OF THE INVENTION

Elastic composites are commonly incorporated into products (e.g., diapers, training pants, garments, etc.) to improve their ability to better fit the contours of the body. For example, the elastic composite may be formed from an elastic film and a nonwoven facing. The nonwoven facing may be bonded to the elastic film through the application of heat and pressure (e.g., calender rolls) while the film is in a stretched condition so that the nonwoven facing can gather and form "pleats" between the locations where it is bonded to the film when it is retracted. The resulting elastic composite is stretchable to the extent that the pleats allow the elastic film to elongate. To reduce costs, it is desirable to form such composites with nonwoven facings having a low basis weight and strength. Unfortunately, however, facings that are low in strength are difficult to manufacture due to their lack of durability and integrity. For example, the heat and pressure applied by conventional calender rolls can significantly damage the integrity of the facing. Furthermore, higher basis weight facings are often required for durability due to the gathering of the material during lamination.

As such, a need currently exists for an elastic composite that is formed from a lightweight and low strength nonwoven facing, yet is also sufficiently durable for effective use in various applications.

SUMMARY OF THE INVENTION

In accordance with one embodiment of the present invention, an elastic composite is disclosed that comprises an elastic film and a nonwoven facing positioned adjacent and laminated to the elastic film. The nonwoven facing has a basis weight of about 45 grams per square meter or less and a peak load of about 350 grams-force per inch or less in the cross-machine direction. Further, the composite exhibits a peak elongation of about 75% or more in the machine direction, the cross-machine direction, or both.

In accordance with another embodiment of the present invention, a method of forming a composite is disclosed. The method comprises extruding an elastomeric composition directly onto a surface of a nonwoven facing to form an elastic film and allowing the film to bond to the nonwoven facing to form a composite. The nonwoven facing has a basis weight of about 45 grams per square meter or less and a peak load of from about 350 grams-force per inch or less in the cross-machine direction. Further, the composite exhibits a peak elongation of about 75% or more in the machine direction, the cross-machine direction, or both.

Other features and aspects of the present invention are described in more detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
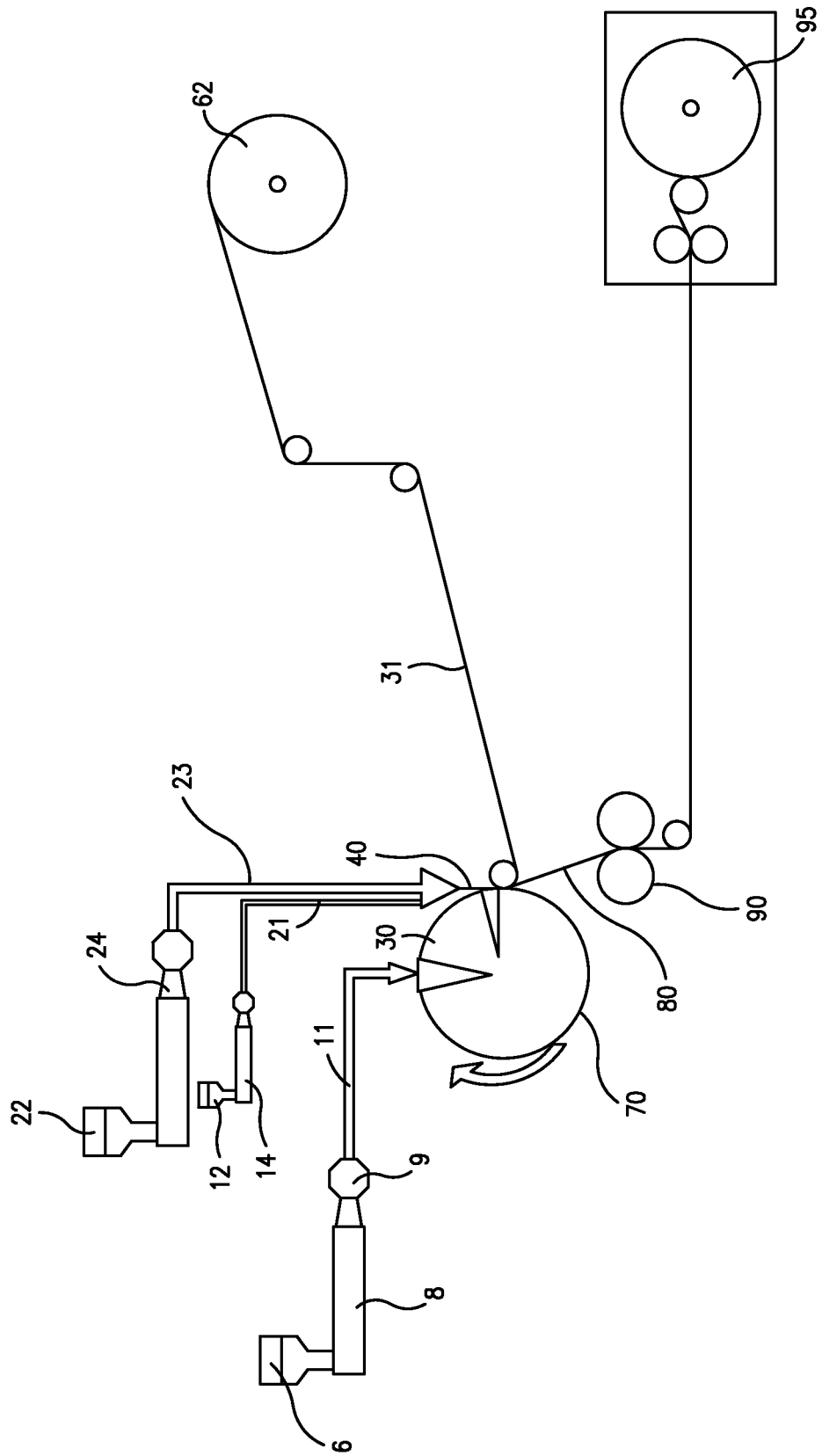
FIG. 1 schematically illustrates a method for forming a composite according to one embodiment of the present invention.

Repeat use of reference characters in the present specification and drawings is intended to represent same or analogous features or elements of the invention.

DETAILED DESCRIPTION OF REPRESENTATIVE EMBODIMENTS

Definitions

As used herein the term "nonwoven web" generally refers to a web having a structure of individual fibers or threads which are interlaid, but not in an identifiable manner as in a knitted fabric. Examples of suitable nonwoven fabrics or webs include, but are not limited to, meltblown webs, spunbond webs, bonded carded webs, airlaid webs, coform webs, hydraulically entangled webs, and so forth.

As used herein, the term "meltblown" web or facing generally refers to a nonwoven web that is formed by a process in which a molten thermoplastic material is extruded through a plurality of fine, usually circular, die capillaries as molten fibers into converging high velocity gas (e.g., air) streams that attenuate the fibers of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin, et al., which is incorporated herein in its entirety by reference thereto for all purposes.

As used herein, the term "spunbond" web or facing generally refers to a web containing small diameter substantially continuous fibers. The fibers are formed by extruding a molten thermoplastic material from a plurality of fine, usually circular, capillaries of a spinnerette with the diameter of the extruded fibers then being rapidly reduced as by, for example, eductive drawing and/or other well-known spunbonding mechanisms. The production of spunbond webs is described and illustrated, for example, in U.S. Pat. No. 4,340,563 to Appel, et al., U.S. Pat. No. 3,692,618 to Dorschner, et al., U.S. Pat. No. 3,802,817 to Matsuki, et al., U.S. Pat. No. 3,338,992 to Kinney, U.S. Pat. No. 3,341,394 to Kinney, U.S. Pat. No. 3,502,763 to Hartman, U.S. Pat. No. 3,502,538 to Levy, U.S. Pat. No. 3,542,615 to Dobo, et al., and U.S. Pat. No. 5,382,400 to Pike, et al., which are incorporated herein in their entirety by reference thereto for all purposes. Spunbond fibers are generally not tacky when they are deposited onto a collecting surface. Spunbond fibers often have a diameter of from about 10 to about 20 micrometers.

As used herein, the terms "machine direction" or "MD" generally refers to the direction in which a material is produced. The term "cross-machine direction" or "CD" refers to the direction perpendicular to the machine direction.

As used herein, the "hysteresis value" of a sample may be determined by first elongating the sample ("load up") and then allowing the sample to retract ("load down"). The hysteresis value is the loss of energy during this cyclic loading.

Detailed Description

Reference now will be made in detail to various embodiments of the invention, one or more examples of which are set forth below. Each example is provided by way of explanation, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention cover such modifications and variations.

Generally speaking, the present invention is directed to an elastic composite formed from a lightweight nonwoven facing that has a low degree of strength in the cross-machine direction ("CD"). Through selective control over certain parameters of the materials employed in the composite and the formation process, the present inventors have discovered that such low strength and lightweight facings may be readily laminated to an elastic film without significantly damaging their integrity. For example, in one embodiment, the elastic film may possess a multi-layered construction that includes an elastomeric elastic layer positioned adjacent to a strength-enhancing thermoplastic layer. The polymer content and thickness of the thermoplastic layer are generally selected to impart additional strength and integrity to the film. Likewise, the polymer content of the elastic layer may also be selected so that the film possesses a sufficient tack for adhering to the facing. In certain cases, it may be desirable to position the layer between two elastic layers so that the strength-enhancing layer does not substantially contact the nonwoven facing. In this manner, the strength-enhancing layer may avoid substantial damage during the lamination process.

In this regard, various embodiments of the present invention will now be described in more detail.

I. Nonwoven Facing

As stated above, the nonwoven facing of the present invention is generally lightweight and has a low degree of strength in the cross-machine direction ("CD"), which increases the flexibility of the composite and also provides significant costs savings in its manufacture. More specifically, the basis weight may range from about 45 grams per square meter or less, in some embodiments from about 1 to about 30 grams per square meter, and in some embodiments, from about 2 to about 20 grams per square meter. Likewise, the nonwoven facing may have a peak load in the cross-machine direction of about 350 grams-force per inch (width) or less, in some embodiments about 300 grams-force per inch or less, in some embodiments from about 50 to about 300 grams-force per inch, in some embodiments from about 60 to about 250 grams-force per inch, and in some embodiments, from about 75 to about 200 grams-force per inch. If desired, the nonwoven facing may also have a low strength in the machine direction ("MD"), such as a peak load in the machine direction of about 3000 grams-force per inch (width) or less, in some embodiments about 2500 grams-force per inch or less, in some embodiments from about 50 to about 2000 grams-force per inch, and in some embodiments, from about 100 to about 1500 grams-force per inch.

The nonwoven facing may be formed from a variety of known processes, such as meltblowing, spunbonding, carding, wet laying, air laying, coform, etc. In one particular embodiment, for example, the nonwoven facing is a meltblown facing that contains "microfibers" in that they have an average size of about 15 micrometers or less, in some embodiments from about 0.01 to about 10 micrometers, and in some embodiments, from about 0.1 to about 5 micrometers.

Regardless of the manner in which it is formed, the nonwoven facing is typically formed from a polymer having a relatively high Vicat softening temperature (ASTM D-1525), such as from about 100° C. to about 300° C., in some embodiments from about 120° C. to about 250° C., and in some embodiments, from about 130° C. to about 200° C. Exemplary high-softening point polymers for use in forming nonwoven facings may include, for instance, polyolefins, e.g., polyethylene, polypropylene, polybutylene, etc.; polytetrafluoroethylene; polyesters, e.g., polyethylene terephthalate and so forth; polyvinyl acetate; polyvinyl chloride acetate; polyvinyl butyral; acrylic resins, e.g., polyacrylate, polymethylacrylate, polymethylmethacrylate, and so forth; polyamides, e.g., nylon; polyvinyl chloride; polyvinylidene chloride; polystyrene; polyvinyl alcohol; polyurethanes; polylactic acid; copolymers thereof; blends thereof; and so forth. It should be noted that the polymer(s) may also contain other additives, such as processing aids or treatment compositions to impart desired properties to the fibers, residual amounts of solvents, pigments or colorants, and so forth.

Monocomponent and/or multicomponent fibers may be used to form the nonwoven facing. Monocomponent fibers are generally formed from a polymer or blend of polymers extruded from a single extruder. Multicomponent fibers are generally formed from two or more polymers (e.g., bicomponent fibers) extruded from separate extruders. The polymers may be arranged in substantially constantly positioned distinct zones across the cross-section of the fibers. The components may be arranged in any desired configuration, such as sheath-core, side-by-side, pie, island-in-the-sea, three island, bull's eye, or various other arrangements known in the art. Various methods for forming multicomponent fibers are described in U.S. Pat. No. 4,789,592 to Taniguchi et al. and U.S. Pat. No. 5,336,552 to Strack et al., U.S. Pat. No. 5,108,820 to Kaneko, et al., U.S. Pat. No. 4,795,668 to Kruege, et al., U.S. Pat. No. 5,382,400 to Pike, et al., U.S. Pat. No. 5,336,552 to Strack, et al., and U.S. Pat. No. 6,200,669 to Marmon, et al., which are incorporated herein in their entirety by reference thereto for all purposes. Multicomponent fibers having various irregular shapes may also be formed, such as described in U.S. Pat. No. 5,277,976 to Hogle, et al., U.S. Pat. No. 5,162,074 to Hills, U.S. Pat. No. 5,466,410 to Hills, U.S. Pat. No. 5,069,970 to Largman, et al., and U.S. Pat. No. 5,057,368 to Largman, et al., which are incorporated herein in their entirety by reference thereto for all purposes.

The desired denier of the fibers used to form the nonwoven facing may vary depending on the desired application. Typically, the fibers are formed to have a denier per filament (i.e., the unit of linear density equal to the mass in grams per 9000 meters of fiber) of less than about 6, in some embodiments less than about 3, and in some embodiments, from about 0.5 to about 3.

Although not required, the nonwoven facing may be optionally bonded using any conventional technique, such as with an adhesive or autogenously (e.g., fusion and/or self-adhesion of the fibers without an applied external adhesive). Suitable autogenous bonding techniques may include ultrasonic bonding, thermal bonding, through-air bonding, calender bonding, and so forth. The temperature and pressure required may vary depending upon many factors including but not limited to, pattern bond area, polymer properties, fiber properties and nonwoven properties. For example, the facing may be passed through a nip formed between two rolls, both of which are typically not patterned i.e., smooth. In this manner, only a small amount of pressure is exerted on the materials to lightly bond them together. Without intending to be limited by theory, the present inventors believe that such lightly bonded materials can retain a higher degree of extensibility and thereby increase the elasticity and extensibility of the resulting composite. For example, the nip pressure may range from about 0.1 to about 20 pounds per linear inch, in some embodiments from about 1 to about 15 pounds per linear inch, and in some embodiments, from about 2 to about 10 pounds per linear inch. One or more of the rolls may likewise have a surface temperature of from about 15° C. to about 60° C., in some embodiments from about 20° C. to about 50° C., and in some embodiments, from about 25° C. to about 40° C.

The nonwoven facing may also be stretched in the machine and/or cross-machine directions prior to lamination to the film of the present invention. Suitable stretching techniques may include necking, tentering, groove roll stretching, etc. For example, the facing may be necked such as described in U.S. Pat. Nos. 5,336,545, 5,226,992, 4,981,747 and 4,965,122 to Morman, as well as U.S. Patent Application Publication No. 2004/0121687 to Morman, et al. Alternatively, the nonwoven facing may remain relatively inextensible in at least one direction prior to lamination to the film. In such embodiments, the nonwoven facing may be optionally stretched in one or more directions subsequent to lamination to the film. The facing may also be subjected to other known processing steps, such as aperturing, heat treatments, etc.

II. Elastic Film

The elastic film of the present invention is formed from one or more elastomeric polymers that are melt-processable, i.e., thermoplastic. Any of a variety of thermoplastic elastomeric polymers may generally be employed in the present invention, such as elastomeric polyesters, elastomeric polyurethanes, elastomeric polyamides, elastomeric copolymers, elastomeric polyolefins, and so forth. In one embodiment, for instance, a substantially amorphous block copolymer may be employed that contains blocks of a monoalkenyl arene and a saturated conjugated diene. Such block copolymers are particularly useful in the present invention due to their high degree of elasticity and tackiness, which enhances the ability of the film to bond to the nonwoven facing.

The monoalkenyl arene block(s) may include styrene and its analogues and homologues, such as o-methyl styrene; p-methyl styrene; p-tert-butyl styrene; 1,3 dimethyl styrene p-methyl styrene; etc., as well as other monoalkenyl polycyclic aromatic compounds, such as vinyl naphthalene; vinyl anthrycene; and so forth. Preferred monoalkenyl arenes are styrene and p-methyl styrene. The conjugated diene block(s) may include homopolymers of conjugated diene monomers, copolymers of two or more conjugated dienes, and copolymers of one or more of the dienes with another monomer in which the blocks are predominantly conjugated diene units. Preferably, the conjugated dienes contain from 4 to 8 carbon atoms, such as 1,3 butadiene (butadiene); 2-methyl-1,3 butadiene; isoprene; 2,3 dimethyl-1,3 butadiene; 1,3 pentadiene (piperylene); 1,3 hexadiene; and so forth. The amount of monoalkenyl arene (e.g., polystyrene) blocks may vary, but typically constitute from about 8 wt. % to about 55 wt. %, in some embodiments from about 10 wt. % to about 35 wt. %, and in some embodiments, from about 25 wt. % to about 35 wt. % of the copolymer. Suitable block copolymers may contain monoalkenyl arene endblocks having a number average molecular weight from about 5,000 to about 35,000 and saturated conjugated diene midblocks having a number average molecular weight from about 20,000 to about 170,000. The total number average molecular weight of the block polymer may be from about 30,000 to about 250,000.

Particularly suitable thermoplastic elastomeric copolymers are available from Kraton Polymers LLC of Houston, Tex. under the trade name KRATON®. KRATON® polymers include styrene-diene block copolymers, such as styrene-butadiene, styrene-isoprene, styrene-butadiene-styrene, and styrene-isoprene-styrene. KRATON® polymers also include styrene-olefin block copolymers formed by selective hydrogenation of styrene-diene block copolymers. Examples of such styrene-olefin block copolymers include styrene-(ethylene-butylene), styrene-(ethylene-propylene), styrene-(ethylene-butylene)-styrene, styrene-(ethylene-propylene)-styrene, styrene-(ethylene-butylene)-styrene-(ethylene-butylene), styrene-(ethylene-propylene)-styrene-(ethylene-propylene), and styrene-ethylene-(ethylene-propylene)-styrene. These block copolymers may have a linear, radial or star-shaped molecular configuration. Specific KRATON® block copolymers include those sold under the brand names G 1652, G 1657, G 1730, MD6673, and MD6973. Various suitable styrenic block copolymers are described in U.S. Pat. Nos. 4,663,220, 4,323,534, 4,834,738, 5,093,422 and 5,304,599, which are hereby incorporated in their entirety by reference thereto for all purposes. Other commercially available block copolymers include the S-EP-S elastomeric copolymers available from Kuraray Company, Ltd. of Okayama, Japan, under the trade designation SEPTON®. Still other suitable copolymers include the S-I-S and S-B-S elastomeric copolymers available from Dexco Polymers of Houston, Tex. under the trade designation VECTOR®. Also suitable are polymers composed of an A-B-A-B tetrablock copolymer, such as discussed in U.S. Pat. No. 5,332,613 to Taylor, et al., which is incorporated herein in its entirety by reference thereto for all purposes. An example of such a tetrablock copolymer is a styrene-poly(ethylene-propylene)-styrene-poly(ethylene-propylene) ("S-EP-S-EP") block copolymer.

Of course, other thermoplastic elastomeric polymers may also be used to form the film, either alone or in conjunction with the block copolymers. Semi-crystalline polyolefins, for example, may be employed that have or are capable of exhibiting a substantially regular structure. Exemplary semi-crystalline polyolefins include polyethylene, polypropylene, blends and copolymers thereof. In one particular embodiment, a polyethylene is employed that is a copolymer of ethylene and an α-olefin, such as a $C_3$-$C_{20}$ α-olefin or $C_3$-$C_{12}$ α-olefin. Suitable α-olefins may be linear or branched (e.g., one or more $C_1$-$C_3$ alkyl branches, or an aryl group). Specific examples include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are 1-butene, 1-hexene and 1-octene. The ethylene content of such copolymers may be from about 60 mole % to about 99 mole %, in some embodiments from about 80 mole % to about 98.5 mole %, and in some embodiments, from about 87 mole % to about 97.5 mole %. The α-olefin content may likewise range from about 1 mole % to about 40 mole %, in some embodiments from about 1.5 mole % to about 15 mole %, and in some embodiments, from about 2.5 mole % to about 13 mole %.

Particularly suitable polyethylene copolymers are those that are "linear" or "substantially linear." The term "substantially linear" means that, in addition to the short chain branches attributable to comonomer incorporation, the ethylene polymer also contains long chain branches in that the polymer backbone. "Long chain branching" refers to a chain length of at least 6 carbons. Each long chain branch may have the same comonomer distribution as the polymer backbone and be as long as the polymer backbone to which it is attached. Preferred substantially linear polymers are substituted with from 0.01 long chain branch per 1000 carbons to 1 long chain branch per 1000 carbons, and in some embodiments, from 0.05 long chain branch per 1000 carbons to 1 long chain branch per 1000 carbons. In contrast to the term "substantially linear", the term "linear" means that the polymer lacks measurable or demonstrable long chain branches. That is, the polymer is substituted with an average of less than 0.01 long chain branch per 1000 carbons.

The density of a linear ethylene/α-olefin copolymer is a function of both the length and amount of the α-olefin. That is, the greater the length of the α-olefin and the greater the amount of α-olefin present, the lower the density of the copolymer. Although not necessarily required, linear polyethylene "plastomers" are particularly desirable in that the content of α-olefin short chain branching content is such that the ethylene copolymer exhibits both plastic and elastomeric characteristics—i.e., a "plastomer." Because polymerization with α-olefin comonomers decreases crystallinity and density, the resulting plastomer normally has a density lower than that of polyethylene thermoplastic polymers (e.g., LLDPE), but approaching and/or overlapping that of an elastomer. For example, the density of the polyethylene plastomer may be 0.91 grams per cubic centimeter (g/cm$^3$) or less, in some embodiments, from 0.85 to 0.88 g/cm$^3$, and in some embodiments, from 0.85 g/cm$^3$ to 0.87 g/cm$^3$. Despite having a density similar to elastomers, plastomers generally exhibit a higher degree of crystallinity, are relatively non-tacky, and may be formed into pellets that are non-adhesive and relatively free flowing.

Preferred polyethylenes for use in the present invention are ethylene-based copolymer plastomers available under the designation EXACT™ from ExxonMobil Chemical Company of Houston, Tex. Other suitable polyethylene plastomers are available under the designation ENGAGE™ and AFFINITY™ from Dow Chemical Company of Midland, Mich. Still other suitable ethylene polymers are available from The Dow Chemical Company under the designations DOWLEX™ (LLDPE) and ATTANE™ (ULDPE). Other suitable ethylene polymers are described in U.S. Pat. No. 4,937,299 to Ewen et al.; U.S. Pat. No. 5,218,071 to Tsutsui et al.; U.S. Pat. No. 5,272,236 to Lai, et al.; and U.S. Pat. No. 5,278,272 to Lai, et al., which are incorporated herein in their entirety by reference thereto for all purposes.

Of course, the present invention is by no means limited to the use of ethylene polymers. For instance, propylene plastomers may also be suitable for use in the film. Suitable plastomeric propylene polymers may include, for instance, copolymers or terpolymers of propylene include copolymers of propylene with an α-olefin (e.g., $C_3$-$C_{20}$), such as ethylene, 1-butene, 2-butene, the various pentene isomers, 1-hexene, 1-octene, 1-nonene, 1-decene, 1-unidecene, 1-dodecene, 4-methyl-1-pentene, 4-methyl-1-hexene, 5-methyl-1-hexene, vinylcyclohexene, styrene, etc. The comonomer content of the propylene polymer may be about 35 wt. % or less, in some embodiments from about 1 wt. % to about 20 wt. %, and in some embodiments, from about 2 wt. % to about 10 wt. %. Preferably, the density of the polypropylene (e.g., propylene/α-olefin copolymer) may be 0.91 grams per cubic centimeter (g/cm$^3$) or less, in some embodiments, from 0.85 to 0.88 g/cm$^3$, and in some embodiments, from 0.85 g/cm$^3$ to 0.87 g/cm$^3$. Suitable propylene polymers are commercially available under the designations VISTAMAXX™ from ExxonMobil Chemical Co. of Houston, Tex.; FINA™ (e.g., 8573) from Atofina Chemicals of Feluy, Belgium; TAFMER™ available from Mitsui Petrochemical Industries; and VERSIFY™ available from Dow Chemical Co. of Midland, Mich. Other examples of suitable propylene polymers are described in U.S. Pat. No. 6,500,563 to Datta, et al.; U.S. Pat. No. 5,539,056 to Yang, et al.; and U.S. Pat. No. 5,596,052 to Resconi, et al., which are incorporated herein in their entirety by reference thereto for all purposes.

Any of a variety of known techniques may generally be employed to form the semi-crystalline polyolefins. For instance, olefin polymers may be formed using a free radical or a coordination catalyst (e.g., Ziegler-Natta). Preferably, the olefin polymer is formed from a single-site coordination catalyst, such as a metallocene catalyst. Such a catalyst system produces ethylene copolymers in which the comonomer is randomly distributed within a molecular chain and uniformly distributed across the different molecular weight fractions. Metallocene-catalyzed polyolefins are described, for instance, in U.S. Pat. No. 5,571,619 to McAlpin et al.; U.S. Pat. No. 5,322,728 to Davis et al.; U.S. Pat. No. 5,472,775 to Obijeski et al.; U.S. Pat. No. 5,272,236 to Lai et al.; and U.S. Pat. No. 6,090,325 to Wheat, et al., which are incorporated herein in their entirety by reference thereto for all purposes. Examples of metallocene catalysts include bis(n-butylcyclopentadienyl)titanium dichloride, bis(n-butylcyclopentadienyl)zirconium dichloride, bis(cyclopentadienyl)scandium chloride, bis(indenyl)zirconium dichloride, bis(methylcyclopentadienyl)titanium dichloride, bis(methylcyclopentadienyl)zirconium dichloride, cobaltocene, cyclopentadienyltitanium trichloride, ferrocene, hafnocene dichloride, isopropyl(cyclopentadienyl,-1-flourenyl)zirconium dichloride, molybdocene dichloride, nickelocene, niobocene dichloride, ruthenocene, titanocene dichloride, zirconocene chloride hydride, zirconocene dichloride, and so forth. Polymers made using metallocene catalysts typically have a narrow molecular weight range. For instance, metallocene-catalyzed polymers may have polydispersity numbers ($M_w/M_n$) of below 4, controlled short chain branching distribution, and controlled isotacticity.

The melt flow index (MI) of the semi-crystalline polyolefins may generally vary, but is typically in the range of about 0.1 grams per 10 minutes to about 100 grams per 10 minutes, in some embodiments from about 0.5 grams per 10 minutes to about 30 grams per 10 minutes, and in some embodiments, about 1 to about 10 grams per 10 minutes, determined at 190° C. The melt flow index is the weight of the polymer (in grams) that may be forced through an extrusion rheometer orifice (0.0825-inch diameter) when subjected to a force of 5000 grams in 10 minutes at 190° C., and may be determined in accordance with ASTM Test Method D1238-E.

Of course, besides elastomeric polymers, generally inelastic thermoplastic polymers may also be used so long as they do not adversely affect the elasticity of the composite. For example, the thermoplastic composition may contain other polyolefins (e.g., polypropylene, polyethylene, etc.). In one embodiment, the thermoplastic composition may contain an additional propylene polymer, such as homopolypropylene or a copolymer of propylene. The additional propylene polymer may, for instance, be formed from a substantially isotactic polypropylene homopolymer or a copolymer containing equal to or less than about 10 wt. % of other monomer, i.e., at least about 90% by weight propylene. Such a polypropylene may be present in the form of a graft, random, or block copolymer and may be predominantly crystalline in that it has a sharp melting point above about 110° C., in some embodiments about above 115° C., and in some embodiments, above about 130° C. Examples of such additional polypropylenes are described in U.S. Pat. No. 6,992,159 to Datta, et al., which is incorporated herein in its entirety by reference thereto for all purposes.

The elastic film of the present invention may also contain other components as is known in the art. In one embodiment, for example, the elastic film contains a filler. Fillers are particulates or other forms of material that may be added to the film polymer extrusion blend and that will not chemically interfere with the extruded film, but which may be uniformly dispersed throughout the film. Fillers may serve a variety of purposes, including enhancing film opacity and/or breathability (i.e., vapor-permeable and substantially liquid-impermeable). For instance, filled films may be made breathable by stretching, which causes the polymer to break away from the filler and create microporous passageways. Breathable microporous elastic films are described, for example, in U.S. Pat. Nos. 5,997,981; 6,015,764; and 6,111,163 to McCormack, et al.; U.S. Pat. No. 5,932,497 to Morman, et al.; U.S. Pat. No. 6,461,457 to Taylor, et al., which are incorporated herein in their entirety by reference thereto for all purposes. Examples of suitable fillers include, but are not limited to, calcium carbonate, various kinds of clay, silica, alumina, barium carbonate, sodium carbonate, magnesium carbonate, talc, barium sulfate, magnesium sulfate, aluminum sulfate, titanium dioxide, zeolites, cellulose-type powders, kaolin, mica, carbon, calcium oxide, magnesium oxide, aluminum hydroxide, pulp powder, wood powder, cellulose derivatives, chitin and chitin derivatives. In certain cases, the filler content of the film may range from about 25 wt. % to about 75 wt. %, in some embodiments, from about 30 wt. % to about 70 wt. %, and in some embodiments, from about 40 wt. % to about 60 wt. % of the film.

Other additives may also be incorporated into the film, such as melt stabilizers, crosslinking catalysts, pro-rad additives, processing stabilizers, heat stabilizers, light stabilizers, antioxidants, heat aging stabilizers, whitening agents, antiblocking agents, bonding agents, tackifiers, viscosity modifiers, etc. Examples of suitable tackifier resins may include, for instance, hydrogenated hydrocarbon resins. REGALREZ™ hydrocarbon resins are examples of such hydrogenated hydrocarbon resins, and are available from Eastman Chemical. Other tackifiers are available from ExxonMobil under the ESCOREZ™ designation. Viscosity modifiers may also be employed, such as polyethylene wax (e.g., EPOLENE™ C-10 from Eastman Chemical). Phosphite stabilizers (e.g., IRGAFOS available from Ciba Specialty Chemicals of Terrytown, N.Y. and DOVERPHOS available from Dover Chemical Corp. of Dover, Ohio) are exemplary melt stabilizers. In addition, hindered amine stabilizers (e.g., CHIMASSORB available from Ciba Specialty Chemicals) are exemplary heat and light stabilizers. Further, hindered phenols are commonly used as an antioxidant in the production of films. Some suitable hindered phenols include those available from Ciba Specialty Chemicals of under the trade name "Irganox®", such as Irganox® 1076, 1010, or E 201. Moreover, bonding agents may also be added to the film to facilitate bonding of the film to additional materials (e.g., nonwoven web). Typically, such additives (e.g., tackifier, antioxidant, stabilizer, etc.) are each present in an amount from about 0.001 wt. % to about 25 wt. %, in some embodiments, from about 0.005 wt. % to about 20 wt. %, and in some embodiments, from 0.01 wt. % to about 15 wt. % of the film.

The elastic film of the present invention may be mono- or multi-layered. Multi-layered films may be prepared by co-extrusion or any other conventional layering technique. When employed, the multi-layered film typically contains at least one thermoplastic layer and at least one elastic layer. The thermoplastic layer may be employed to provide strength and integrity to the resulting composite, while the elastic layer may be employed to provide elasticity and sufficient tack for adhering to the nonwoven facing. In one particular embodiment of the present invention, the film includes at least one thermoplastic layer positioned between at least two elastic layers. In this manner, the thermoplastic layer does not substantially contact the nonwoven facing and is thus able to avoid substantial damage during lamination. In such embodiments, one or more elastic layers are generally formed from an elastomeric composition, such as described above, to provide the desired degree of elasticity in the film. To impart the desired elastic properties to the film, elastomers typically constitute about 55 wt. % or more, in some embodiments about 60 wt. % or more, and in some embodiments, from about 65 wt. % to 100 wt. % of the polymer content of the elastomeric composition used to form the elastic layer(s). In fact, in certain embodiments, the elastic layer(s) may be generally free of polymers that are inelastic. For example, such inelastic polymers may constitute about 15 wt. % or less, in some embodiments about 10 wt. % or less, and in some embodiments, about 5 wt. % or less of the polymer content of the elastomeric composition.

Although the thermoplastic layer(s) may possess some degree of elasticity, such layers are generally formed from a thermoplastic composition that is less elastic than the elastic layer(s) to ensure that the strength of the film is sufficiently enhanced. For example, one or more elastic layers may be formed primarily from substantially amorphous elastomers (e.g., styrene-olefin copolymers) and one or more thermoplastic layers may be formed from polyolefin plastomers (e.g., single-site catalyzed ethylene or propylene copolymers), which are described in more detail above. Although possessing some elasticity, such polyolefins are generally less elastic than substantially amorphous elastomers. Of course, the thermoplastic layer(s) may contain generally inelastic polymers, such as conventional polyolefins, e.g., polyethylene (low density polyethylene ("LDPE"), Ziegler-Natta catalyzed linear low density polyethylene ("LLDPE"), etc.), polypropylene, polybutylene, etc.; polytetrafluoroethylene; polyesters, e.g., polyethylene terephthalate, etc.; polyvinyl acetate; polyvinyl chloride acetate; polyvinyl butyral; acrylic resins, e.g., polyacrylate, polymethylacrylate, polymethylmethacrylate, etc.; polyamides, e.g., nylon; polyvinyl chloride; polyvinylidene chloride; polystyrene; polyvinyl alcohol; polyurethanes; polylactic acid; copolymers and mixtures thereof; and so forth. In certain embodiments, polyolefins (e.g., conventional and/or plastomers) are employed and constitute about 55 wt. % or more, in some embodiments about 60 wt. % or more, and in some embodiments, from about 65 wt. % to 100 wt. % of the polymer content of the thermoplastic composition used to form the thermoplastic layer(s).

The thickness of the thermoplastic and elastic layers is generally selected so as to achieve an appropriate balance between film elasticity and strength. For instance, the thickness of an elastic layer is typically from about 20 to about 200 micrometers, in some embodiments from about 25 to about 175 micrometers, and in some embodiments, from about 30 to about 150 micrometers. The elastic layer(s) may also constitute from about 70% to about 99.5% of the total thickness of the film, and in some embodiments from about 80% to about 99% of the total thickness of the film. On the other hand, the thickness of a thermoplastic layer(s) is typically from about 0.5 to about 20 micrometers, in some embodiments from about 1 to about 15 micrometers, and in some embodiments, from about 2 to about 12 micrometers. The thermoplastic layer(s) may also constitute from about 0.5% to about 30% of the total thickness of the film, and in some embodiments from about 1% to about 20% of the total thickness of the film. The film may also have a total thickness of from about 20 to about 250 micrometers, in some embodiments, from about 25 to about 225 micrometers, and in some embodiments, from about 30 to about 200 micrometers.

Regardless of the particular film content, the film and/or the materials used to form the film may also be subjected to one or more additional processing steps. In one embodiment, for example, an elastomeric polymer employed in the film is crosslinked, before, after, and/or during lamination to the nonwoven facing, to provide the film with enhanced elastic characteristics. Crosslinking may be induced by subjecting the polymer to electromagnetic radiation, such as ultraviolet light, electron beam radiation, natural and artificial radio isotopes (e.g., $\alpha$, $\beta$, and $\gamma$ rays), x-rays, neutron beams, positively-charged beams, laser beams, and so forth. The wavelength ("$\lambda$") of the electromagnetic radiation may be about 1000 nanometers or less, in some embodiments about 100 nanometers or less, and in some embodiments, about 1 nanometer or less. Electron beam radiation, for instance, typically has a wavelength of about 1 nanometer or less. The total dosage employed (in one or multiple steps) may likewise range from about 1 megarad (Mrad) to about 30 Mrads, in some embodiments, from about 3 Mrads to about 25 Mrads, and in some embodiments, from about 5 to about 15 Mrads. In addition, the energy level may range from about 0.05 megaelectron volts (MeV) to about 600 MeV. Upon crosslinking, a three-dimensional crosslinked network may be formed that provides the material with additional elasticity in the machine direction, cross-machine direction, or both.

III. Other Facings

If desired, the composite of the present invention may also include other facings as is known in the art, such as nonwoven web materials, films, foams, etc. For example, the composite may include an additional nonwoven facing, such as a meltblown web, spunbond web, bonded carded web, wetlaid web, airlaid web, coform web, etc., as well as combinations of the foregoing. In one particular embodiment, the additional facing may be a bonded carded facing. Fibers of any desired length may be employed in the bonded carding facing, such as staple fibers, continuous fibers, etc. For example, staple fibers may be used that have a fiber length in the range of from about 1 to about 150 millimeters, in some embodiments from about 5 to about 50 millimeters, in some embodiments from about 10 to about 40 millimeters, and in some embodiments, from about 10 to about 25 millimeters. Such fibers may be formed into a carded web by placing bales of the fibers into a picker that separates the fibers. Next, the fibers are sent through a combing or carding unit that further breaks apart and aligns the fibers in the machine direction so as to form a machine direction-oriented fibrous nonwoven web. The carded web may then be lightly bonded in a manner such as described above.

Although not required, the additional facing may also be lightweight and of low strength. For example, the basis weight of the facing may range from about 1 to about 45 grams per square meter, in some embodiments from about 2 to about 30 grams per square meter, and in some embodiments, from about 3 to about 20 grams per square meter. The facing may also have a peak load in the cross-machine direction ("CD") of about 350 grams-force per inch (width) or less, in some embodiments about 300 grams-force per inch or less, in some embodiments from about 50 to about 300 grams-force per inch, in some embodiments from about 60 to about 250 grams-force per inch, and in some embodiments, from about 75 to about 200 grams-force per inch. If desired, the nonwoven facing may also have a low strength in the machine direction ("MD"), such as a peak load in the machine direction of about 3000 grams-force per inch (width) or less, in some embodiments about 2500 grams-force per inch or less, in some embodiments from about 50 to about 2000 grams-force per inch, and in some embodiments, from about 100 to about 1500 grams-force per inch.

As described above, the additional nonwoven facing may also be stretched in the machine and/or cross-machine directions prior to lamination to the film of the present invention, as well as subjected to other known processing steps, such as aperturing, heat treatments, etc.

IV. Lamination Technique

To enhance the durability and stability of the resulting composite, the film is typically laminated to the facing by directly extruding the elastomeric composition onto a surface of the nonwoven facing. This allows for an enhanced degree of contact between the elastomeric composition and fibers of the nonwoven facing, which further increases the ability of the meltblown fibers to bond to the elastomeric composition. In this manner, a sufficient degree of bonding is achieved without requiring the application of a substantial amount of heat and pressure used in conventional calender bonding processes, which can damage the low strength nonwoven facing. If desired, lamination may be facilitated through the use of a variety of techniques, such as adhesives, suctional forces, etc. In one embodiment, for example, the film is biased toward the facing during lamination with a suctional force.

Regardless of the lamination technique employed, the selection of an appropriate bonding temperature will help melt and/or soften the elastomeric polymer(s) of the film so that it may flow and become fused to the nonwoven facing, thereby forming an integral nonwoven composite. Furthermore, because the elastomeric polymer(s) may physically entrap or adhere to the fibers at the bond sites, adequate bond formation may be achieved without requiring substantial softening of the polymer(s) used to form the nonwoven facing. Of course, it should be understood that the temperature of the nonwoven facing may be above its softening point in certain embodiments. To achieve the desired degree of bond formation between the film and nonwoven facing, the temperature at which the elastomeric composition is extruded is typically from about 50° C. to about 300° C., in some embodiments from about 60° C. to about 275° C., and in some embodiments, from about 70° C. to about 260° C.

Various embodiments of the lamination technique of the present invention will now be described in greater detail. Referring to FIG. 1, for instance, one embodiment of a method for forming a composite from an elastic film and a meltblown facing is shown. In this embodiment, a meltblown facing 30 is formed in-line by feeding raw materials (e.g., polypropylene) into an extruder 8 from a hopper 6, and thereafter supplying the extruded composition to a meltblown die 9. As the polymer exits the die 9 at an orifice (not shown), high pressure fluid (e.g., heated air) attenuates and spreads the polymer stream into microfibers 11 that are randomly deposited onto a surface of a roll 70 to form a meltblown facing 30. It should be understood that the meltblown facing 30 may also be formed on a separate foraminous surface (e.g., wire, belt, fabric, etc.) that subsequently traverses over the roll 70. Further, it should be understood that the meltblown facing 30 may simply be unwound from a supply roll rather than formed in-line In the embodiment shown in FIG. 1, an elastic film is also formed that contains a single thermoplastic layer 23 and a single elastic layer 21. More specifically, the raw materials of the elastic layer 21 may be added to a hopper 12 of an extruder 14 and the raw materials of the thermoplastic layer 23 may be added to a hopper 22 of an extruder 24. The materials are dispersively mixed and compounded under at an elevated temperature within the extruders 14 and 24. Within the extruder 14, for example, melt blending of the elastomeric composition may occur at a temperature of from about 50° C. to about 300° C., in some embodiments from about 60° C. to about 275° C., and in some embodiments, from about 70° C. to about 260° C. Melt blending of the thermoplastic composition may occur within the extruder 24 at a temperature that is the same, lower, or higher than employed for the elastomeric composition. For example, melt blending of the thermoplastic composition may occur in some instances at a temperature of from about 50° C. to about 250° C., in some embodiments from about 60° C. to about 225° C., and in some embodiments, from about 70° C. to about 200° C. The apparent shear rate during melt blending may range from about 100 seconds$^{-1}$ to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$. The apparent shear rate is equal to $4Q/\pi R^3$, where Q is the volumetric flow rate ("m$^3$/s") of the polymer melt and R is the radius ("m") of the capillary (e.g., extruder die) through which the melted polymer flows.

Any known technique may be used to form a film from the compounded material, including casting, flat die extruding, etc. In the particular embodiment of FIG. 1, for example, the elastic and thermoplastic layers are "cast" onto the meltblown facing 30, which is positioned on the roll 70, as is known in the art. A cast film 40 is thus formed on the facing 30 such that the elastic layer 21 is positioned directly adjacent to the facing 30. To enhance bonding between the film 40 and the facing 30, a suctional force may be applied to bias the film 40 against an upper surface of the meltblown facing 30. This may be accomplished in a variety of ways (e.g., vacuum slots, shoes, rolls, etc.) and at a variety of locations throughout the composite-forming process. In the embodiment shown in FIG. 1, for example, the roll 70 on which the film 40 is cast is a vacuum roll capable of applying the desired suctional force. The amount of suctional force may be selectively controlled to enhance bonding without significantly deteriorating the integrity of the low strength facing. For example, pneumatic vacuum pressure may be employed to apply the suctional force that is about 0.25 kilopascals or more, in some embodiments about from about 0.3 to about 5 kilopascals, and in some embodiments, from about 0.5 to about 2 kilopascals. Such vacuum-assisted lamination allows for the formation of a strong composite without the need for a substantial amount of heat and pressure normally used in calender lamination methods that could otherwise diminish the integrity of the nonwoven facing. In fact, the roll 70 on which the film 40 is formed may even be kept at ambient temperature if so desired.

Although not necessarily required, a second facing 31 may also be laminated to the elastic film 40. The second facing 31 may be formed in-line or originated from a supply roll (e.g., roll 62). The second facing 31 may be a nonwoven facing, as well as another type of nonwoven web material, film, foam, etc. Upon lamination, the elastic film 40 is melt fused to the facings 30 and 31 at a plurality of discrete bond sites to form a composite 80. That is, the elastomeric polymer(s) of the film 40 are softened and/or melted so that they may physically entrap fibers of the materials 30 and 31. The elastic film 40 may possess a certain tack so that it also adheres to the fibers upon lamination. If desired, bonding may occur at a temperature that is insufficient to substantially soften the polymer(s) of the facings 30 and 31 so that they are not substantially melt fused to each other. In this manner, the resulting composite 80 may better retain the physical properties (e.g., liquid permeability, softness, bulk, and hand feel) of the nonwoven facings.

Various additional potential processing and/or finishing steps known in the art, such as slitting, stretching, etc., may be performed without departing from the spirit and scope of the invention. For instance, the composite may optionally be mechanically stretched in the cross-machine and/or machine directions to enhance extensibility. In the embodiment shown in FIG. 1, for example, the composite may be coursed through two or more rolls 90 that have grooves in the CD and/or MD directions that incrementally stretch the composite in the CD and/or MD direction. Such grooved satellite/anvil roll arrangements are described in U.S. Patent Application Publication Nos. 2004/0110442 to Rhim, et al. and 2006/0151914 to Gerndt, et al., which are incorporated herein in their entirety by reference thereto for all purposes. The grooved rolls 90 may be constructed of steel or other hard material (such as a hard rubber).

Figure 4:
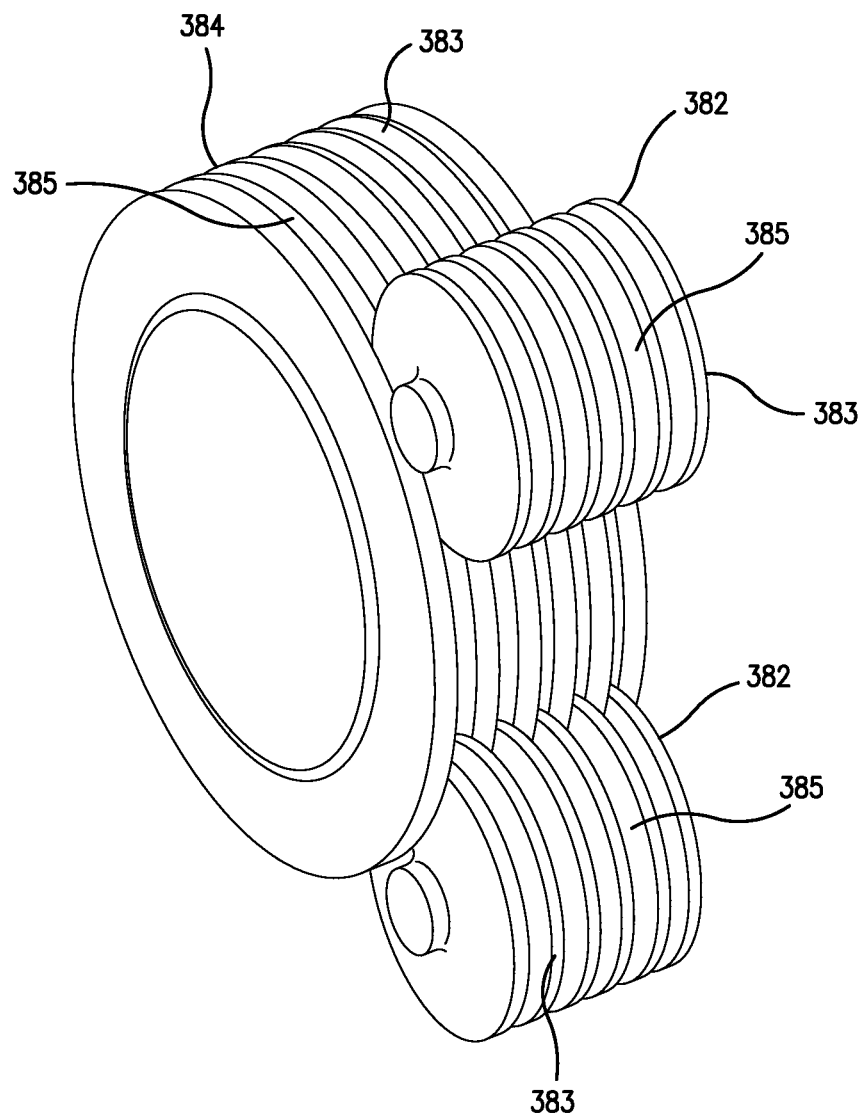
FIG. 4 is a perspective view of grooved rolls that may be used in one embodiment of the present invention.
Figure 5:
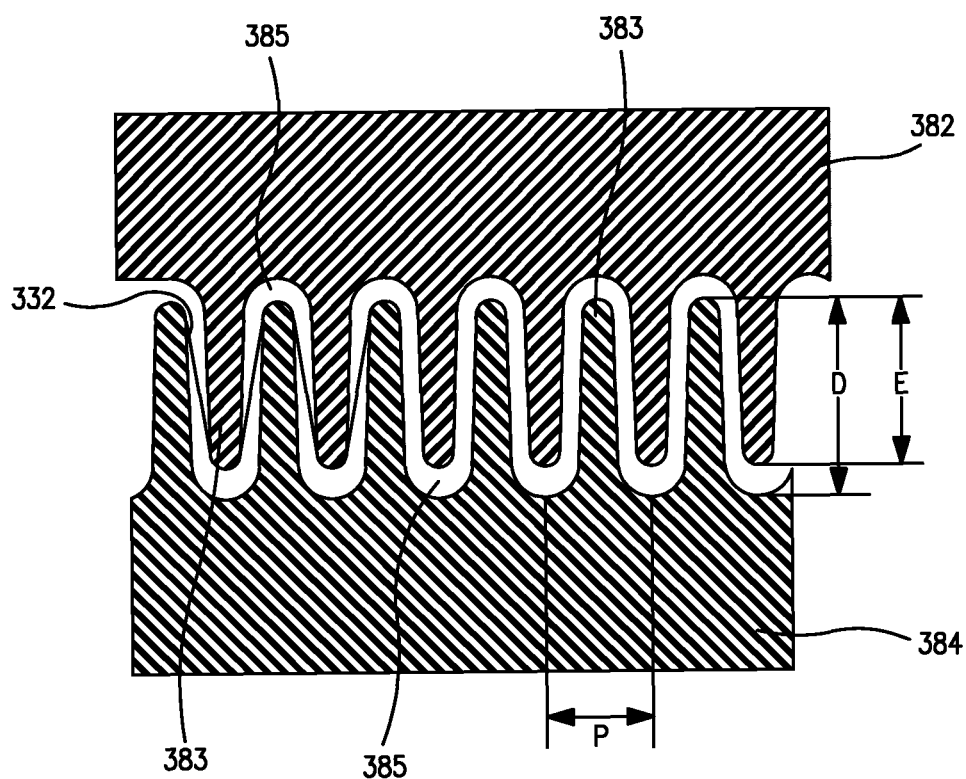
FIG. 5 is a cross-sectional view showing the engagement between two of the grooved rolls of FIG. 4.

FIGS. 4-5 further illustrate the manner in which groove rolls may incrementally stretch the composite. As shown, for example, satellite rolls 382 may engage an anvil roll 384, each of which include a plurality of ridges 383 defining a plurality of grooves 385 positioned across the grooved rolls in the cross-machine direction. The grooves 385 are generally oriented perpendicular to the direction of stretch of the material. In other words, the grooves 385 are oriented in the machine direction to stretch the composite in the cross-machine direction. The grooves 385 may likewise be oriented in the cross-machine direction to stretch the composite in the machine direction. The ridges 383 of satellite roll 382 intermesh with the grooves 385 of anvil roll 384, and the grooves 385 of satellite roll 382 intermesh with the ridges 383 of anvil roll 384.

The dimensions and parameters of the grooves 385 and ridges 383 may have a substantial effect on the degree of extensibility provided by the rolls 382 and 384. For example, the number of grooves 385 contained on a roll may generally range from about 3 and 15 grooves per inch, in some embodiments from about 5 and 12 grooves per inch, and in some embodiments, from about 5 and 10 grooves per inch. The grooves 385 may also have a certain depth "D", which generally ranges from about 0.25 to about 1.0 centimeter, and in some embodiments, from about 0.4 to about 0.6 centimeters. In addition, the peak-to-peak distance "P" between the grooves 385 is typically from about 0.1 to about 0.9 centimeters, and in some embodiments, from about 0.2 to about 0.5 centimeters. Also, the groove roll engagement distance "E" between the grooves 385 and ridges 383 may be from about 0.05 to about 0.8 centimeters, in some embodiments from about 0.1 to about 0.7 centimeters, and in some embodiments, from about 0.15 to about 0.6 centimeters. Regardless, the composite 80 (FIG. 1) may be stretched in one or more directions to a dimension (e.g., length or width) that is from about 100% to about 750%, in some embodiments by from about 125% to about 500%, and in some embodiments, from about 150% to about 400% of its initial dimension prior to stretching. If desired, heat may be applied to the composite just prior to or during the application of incremental stretch to cause it to relax somewhat and ease extension. Heat may be applied by any suitable method known in the art, such as heated air, infrared heaters, heated nipped rolls, or partial wrapping of the laminate around one or more heated rolls or steam canisters, etc. Heat may also be applied to the grooved rolls themselves. It should also be understood that other grooved roll arrangement are equally suitable, such as two grooved rolls positioned immediately adjacent to one another.

Besides the above-described grooved rolls, other techniques may also be used to mechanically stretch the composite in one or more directions. For example, the composite may be passed through a tenter frame that stretches the composite. Such tenter frames are well known in the art and described, for instance, in U.S. Patent Application Publication No. 2004/0121687 to Morman, et al. The composite may also be necked. Suitable techniques necking techniques are described in U.S. Pat. Nos. 5,336,545, 5,226,992, 4,981,747 and 4,965,122 to Morman, as well as U.S. Patent Application Publication No. 2004/0121687 to Morman, et al., all of which are incorporated herein in their entirety by reference thereto for all purposes.

Referring again to FIG. 1, the composite 80, upon formation, may then be slit, wound, and stored on a take-up roll 95. The composite 80 may be allowed to retract in the machine direction prior to and/or during winding on to the take-up roll 95. This may be achieved by using a slower linear velocity for the roll 95. Alternatively, the composite 80 may be wound onto the roll 95 under tension.

In the embodiment shown in FIG. 1 and described above, the elastic layer of the film is positioned between the nonwoven facing and thermoplastic layer of the film. In such embodiments, however, the thermoplastic layer remains exposed and may become damaged during subsequent processing, such as when stretching the composite in the CD and/or MD direction with the grooved rolls. In some cases, the damage may be to such an extent that the thermoplastic layer does not impart the desired degree of strength to the composite. Thus, to minimize such damage, one or more additional elastic layers may be employed such that the thermoplastic layer is positioned between at least two elastic layers and thus protected during processing.

Figure 2:
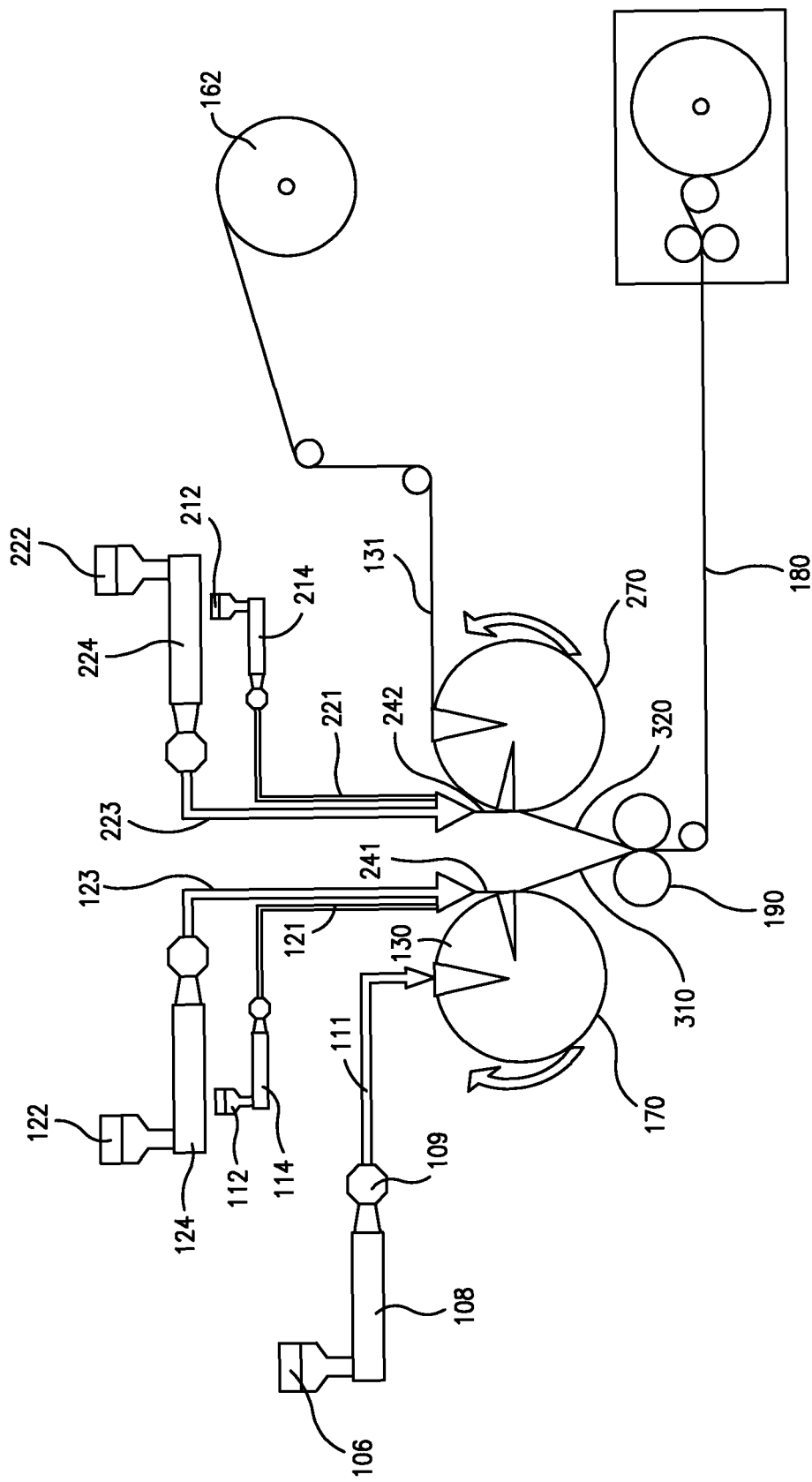
FIG. 2 schematically illustrates a method for forming a composite according to another embodiment of the present invention.

Referring to FIG. 2, for instance, one embodiment of a method for forming a composite from elastic film containing two thermoplastic layers positioned between two elastic layers. In this embodiment, a nonwoven facing 130 is formed in-line by feeding raw materials into an extruder 108 from a hopper 106, and thereafter supplying the extruded composition to a meltblown die 109. Microfibers 111 are randomly deposited onto a surface of a roll 170 to form a nonwoven facing 130. The raw materials of a first elastic layer 121 are also added to a hopper 112 of an extruder 114 and the raw materials of a first thermoplastic layer 123 are added to a hopper 122 of an extruder 124. The materials are co-extruded onto the nonwoven facing 130, which is positioned on the roll 170, to form a first film precursor 241. Similarly, the raw materials of a second elastic layer 221 are added to a hopper 212 of an extruder 214 and the raw materials of a second thermoplastic layer 223 are added to a hopper 222 of an extruder 224. The materials are then co-extruded onto a nonwoven facing 131, which is unwound from a supply roll 162 and positioned on a second roll 270, to form a second film precursor 242.

As described above, a suctional force may be applied to bias the first film precursor 241 against an upper surface of the nonwoven facing 130 to form a first composite precursor 310. A suctional force may likewise be applied to bias the second film precursor 242 against an upper surface of the nonwoven facing 131 to form a second composite precursor 320. In the embodiment shown in FIG. 2, the composite precursors 310 and 320 are then passed between grooved rolls 190 for stretching in the CD and/or MD direction and to form a unitary composite 180 containing a film formed from the separate film precursors 241 and 242. Of course, rather than forming the film and composite from separate film precursors that are subsequently brought together as shown in FIG. 2, it should also be understood that other techniques may also be employed. For example, the film may simply be formed by co-extruding the respective compositions together onto a surface of one of the rolls, as is well known in the art.

Regardless of the particular manner in which it is formed, the present inventors have discovered that the resulting composite possesses a high degree of extensibility and elastic recovery. That is, the composite may exhibit an elongation at peak load ("peak elongation") in the cross-machine direction, machine direction, or both of about 75% or more, in some embodiments about 100% or more, and in some embodiments, from about 150% to about 500%. The composite may also be elastic in that it is extensible in at least one direction upon application of the stretching force and, upon release of the stretching force, contracts/returns to approximately its original dimension. For example, a stretched material may have a stretched length that is at least 50% greater than its relaxed unstretched length, and which will recover to within at least 50% of its stretched length upon release of the stretching force. A hypothetical example would be a one (1) inch sample of a material that is stretchable to at least 1.50 inches and which, upon release of the stretching force, will recover to a length of not more than 1.25 inches. Desirably, the composite contracts or recovers at least 50%, and even more desirably, at least 80% of the stretched length.

The composite may also possess a high degree of strength in the machine direction and/or cross-machine direction. For example, the CD peak load of the composite may be at least about 1000 grams-force per inch ("$g_f$/in"), in some embodiments from about 1100 to about 3000 $g_f$/in, and in some embodiments, from about 1200 to about 2500 $g_f$/in. Likewise, the MD peak load may be at least about 1500 grams-force per inch ("$g_f$/in"), in some embodiments from about 1500 to about 6000 $g_f$/in, and in some embodiments, from about 2000 to about 5000 $g_f$/in.

V. Articles

The composite of the present invention may be used in a wide variety of applications. As noted above, for example, the composite may be used in an absorbent article. An "absorbent article" generally refers to any article capable of absorbing water or other fluids. Examples of some absorbent articles include, but are not limited to, personal care absorbent articles, such as diapers, training pants, absorbent underpants, incontinence articles, feminine hygiene products (e.g., sanitary napkins), swim wear, baby wipes, and so forth; medical absorbent articles, such as garments, fenestration materials, underpads, bedpads, bandages, absorbent drapes, and medical wipes; food service wipers; clothing articles; and so forth. Materials and processes suitable for forming such absorbent articles are well known to those skilled in the art. Typically, absorbent articles include a substantially liquid-impermeable layer (e.g., outer cover), a liquid-permeable layer (e.g., bodyside liner, surge layer, etc.), and an absorbent core. In one particular embodiment, the composite of the present invention may be used in providing elastic waist, leg cuff/gasketing, stretchable ear, side panel or stretchable outer cover applications.

Figure 3:
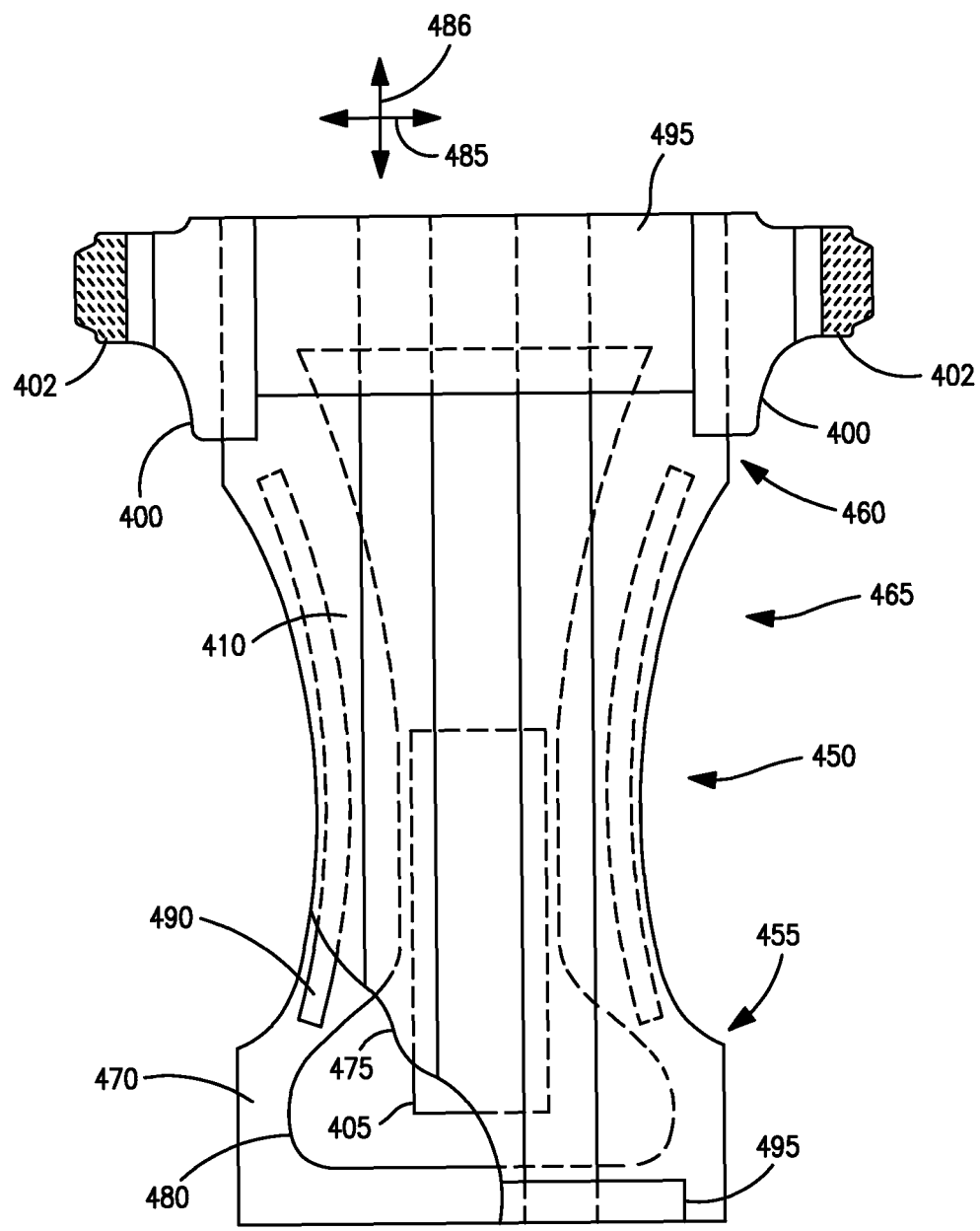
FIG. 3 is a perspective view of a personal care product that may be formed in accordance with one embodiment of the present invention.

Various embodiments of an absorbent article that may be formed according to the present invention will now be described in more detail. Referring to FIG. 3, for example, one embodiment of a disposable diaper 450 is shown that generally defines a front waist section 455, a rear waist section 460, and an intermediate section 465 that interconnects the front and rear waist sections. The front and rear waist sections 455 and 460 include the general portions of the diaper which are constructed to extend substantially over the wearer's front and rear abdominal regions, respectively, during use. The intermediate section 465 of the diaper includes the general portion of the diaper that is constructed to extend through the wearer's crotch region between the legs. Thus, the intermediate section 465 is an area where repeated liquid surges typically occur in the diaper.

The diaper 450 includes, without limitation, an outer cover, or backsheet 470, a liquid permeable bodyside liner, or topsheet, 475 positioned in facing relation with the backsheet 470, and an absorbent core body, or liquid retention structure, 480, such as an absorbent pad, which is located between the backsheet 470 and the topsheet 475. The backsheet 470 defines a length, or longitudinal direction 486, and a width, or lateral direction 485 which, in the illustrated embodiment, coincide with the length and width of the diaper 450. The liquid retention structure 480 generally has a length and width that are less than the length and width of the backsheet 470, respectively. Thus, marginal portions of the diaper 450, such as marginal sections of the backsheet 470 may extend past the terminal edges of the liquid retention structure 480. In the illustrated embodiments, for example, the backsheet 470 extends outwardly beyond the terminal marginal edges of the liquid retention structure 480 to form side margins and end margins of the diaper 450. The topsheet 475 is generally coextensive with the backsheet 470 but may optionally cover an area that is larger or smaller than the area of the backsheet 470, as desired.

To provide improved fit and to help reduce leakage of body exudates from the diaper 450, the diaper side margins and end margins may be elasticized with suitable elastic members, as further explained below. For example, as representatively illustrated in FIG. 3, the diaper 450 may include leg elastics 490 constructed to operably tension the side margins of the diaper 450 to provide elasticized leg bands which can closely fit around the legs of the wearer to reduce leakage and provide improved comfort and appearance. Waist elastics 495 are employed to elasticize the end margins of the diaper 450 to provide elasticized waistbands. The waist elastics 495 are configured to provide a resilient, comfortably close fit around the waist of the wearer. The elastic composite of the present invention is suitable for use as the leg elastics 490 and waist elastics 495. Exemplary of such materials are laminate sheets that either comprise or are adhered to the backsheet, such that elastic constrictive forces are imparted to the backsheet 470.

As is known, fastening means, such as hook and loop fasteners, may be employed to secure the diaper 450 on a wearer. Alternatively, other fastening means, such as buttons, pins, snaps, adhesive tape fasteners, cohesives, fabric-and-loop fasteners, or the like, may be employed. In the illustrated embodiment, the diaper 450 includes a pair of side panels 400 (or ears) to which the fasteners 402, indicated as the hook portion of a hook and loop fastener, are attached. Generally, the side panels 400 are attached to the side edges of the diaper in one of the waist sections 455, 460 and extend laterally outward therefrom. The side panels 400 may be elasticized or otherwise rendered elastomeric by use of the elastic composite of the present invention. Examples of absorbent articles that include elasticized side panels and selectively configured fastener tabs are described in PCT Patent Application WO 95/16425 to Roessler; U.S. Pat. No. 5,399,219 to Roessler et al.; U.S. Pat. No. 5,540,796 to Fries; and U.S. Pat. No. 5,595,618 to Fries, each of which is incorporated herein in its entirety by reference thereto for all purposes.

The diaper 450 may also include a surge management layer 405, located between the topsheet 475 and the liquid retention structure 480, to rapidly accept fluid exudates and distribute the fluid exudates to the liquid retention structure 480 within the diaper 450. The diaper 450 may further include a ventilation layer (not illustrated), also called a spacer, or spacer layer, located between the liquid retention structure 480 and the backsheet 470 to insulate the backsheet 470 from the liquid retention structure 480 to reduce the dampness of the garment at the exterior surface of a breathable outer cover, or backsheet, 470. Examples of suitable surge management layers 305 are described in U.S. Pat. No. 5,486,166 to Bishop and U.S. Pat. No. 5,490,846 to Ellis.

As representatively illustrated in FIG. 3, the disposable diaper 450 may also include a pair of containment flaps 410 which are configured to provide a barrier to the lateral flow of body exudates. The containment flaps 410 may be located along the laterally opposed side edges of the diaper adjacent the side edges of the liquid retention structure 480. Each containment flap 410 typically defines an unattached edge that is configured to maintain an upright, perpendicular configuration in at least the intermediate section 465 of the diaper 450 to form a seal against the wearer's body. The containment flaps 410 may extend longitudinally along the entire length of the liquid retention structure 480 or may only extend partially along the length of the liquid retention structure. When the containment flaps 410 are shorter in length than the liquid retention structure 480, the containment flaps 410 can be selectively positioned anywhere along the side edges of the diaper 450 in the intermediate section 465. Such containment flaps 410 are generally well known to those skilled in the art. For example, suitable constructions and arrangements for containment flaps 410 are described in U.S. Pat. No. 4,704,116 to Enloe.

The diaper 450 may be of various suitable shapes. For example, the diaper may have an overall rectangular shape, T-shape or an approximately hour-glass shape. In the shown embodiment, the diaper 450 has a generally I-shape. Other suitable components which may be incorporated on absorbent articles of the present invention may include waist flaps and the like which are generally known to those skilled in the art. Examples of diaper configurations suitable for use in connection with the elastic composite of the present invention that may include other components suitable for use on diapers are described in U.S. Pat. No. 4,798,603 to Meyer et al.; U.S. Pat. No. 5,176,668 to Bernardin; U.S. Pat. No. 5,176,672 to Bruemmer et al.; U.S. Pat. No. 5,192,606 to Proxmire et al.; and U.S. Pat. No. 5,509,915 to Hanson et al., which are incorporated herein in their entirety by reference thereto for all purposes.

The various regions and/or components of the diaper 450 may be assembled together using any known attachment mechanism, such as adhesive, ultrasonic, thermal bonds, etc. Suitable adhesives may include, for instance, hot melt adhesives, pressure-sensitive adhesives, and so forth. When utilized, the adhesive may be applied as a uniform layer, a patterned layer, a sprayed pattern, or any of separate lines, swirls or dots. In the illustrated embodiment, for example, the topsheet 475 and backsheet 470 may be assembled to each other and to the liquid retention structure 480 with lines of adhesive, such as a hot melt, pressure-sensitive adhesive. Similarly, other diaper components, such as the elastic members 490 and 495, fastening members 402, and surge layer 405 may be assembled into the article by employing the above-identified attachment mechanisms.

Although various configurations of a diaper have been described above, it should be understood that other diaper and absorbent article configurations are also included within the scope of the present invention. In addition, the present invention is by no means limited to diapers. In fact, several examples of absorbent articles are described in U.S. Pat. No. 5,649,916 to DiPalma, et al.; U.S. Pat. No. 6,110,158 to Kielpikowski; U.S. Pat. No. 6,663,611 to Blaney, et al., which are incorporated herein in their entirety by reference thereto for all purposes. Further, other examples of personal care products that may incorporate such materials are training pants (such as in side panel materials) and feminine care products. By way of illustration only, training pants suitable for use with the present invention and various materials and methods for constructing the training pants are disclosed in U.S. Pat. No. 6,761,711 to Fletcher et al.; U.S. Pat. No. 4,940,464 to Van Gompel et al.; U.S. Pat. No. 5,766,389 to Brandon et al.; and U.S. Pat. No. 6,645,190 to Olson et al.; which are incorporated herein in their entirety by reference thereto for all purposes.

The present invention may be better understood with reference to the following examples.

Test Methods

Tensile Properties:

The strip tensile strength values were determined in substantial accordance with ASTM Standard D-5034. Specifically, a sample was cut or otherwise provided with size dimensions that measured 1 inch (25.4 millimeters) (width)×6 inches (152.4 millimeters) (length). A constant-rate-of-extension type of tensile tester was employed. The tensile testing system was a Sintech Tensile Tester, which is available from MTS Corp. of Eden Prairie, Minn. The tensile tester was equipped with TESTWORKS 4.08B software from MTS Corporation to support the testing. An appropriate load cell was selected so that the tested value fell within the range of 10-90% of the full scale load. The sample was held between grips having a front and back face measuring 1 inch (25.4 millimeters)×3 inches (76 millimeters). The grip faces were rubberized, and the longer dimension of the grip was perpendicular to the direction of pull. The grip pressure was pneumatically maintained at a pressure of 60 to 80 pounds per square inch. The tensile test was run at a 20 inches per minute rate with a gauge length of 4 inches and a break sensitivity of 40%. Three samples were tested along the machine-direction ("MD") and three samples were tested by along the cross direction ("CD"). In addition, the ultimate tensile strength ("peak load"), and peak elongation was also recorded.

Stretch-to-Stop

The testing was done on a Sintech. constant rate of extension tester 2/S with a Renew MTS mongoose box (controller) using TESTWORKS 4.08b software (MTS Corp, of Eden Prairie, Minn.). The percent elongation of the material at a load of 2000 grams-force was determined as described below. Such measurements are determined using the "strip elongation test", which is substantially in accordance with the specifications of ASTM D5035-95. The test uses two clamps, each having two jaws with each jaw having a facing in contact with the sample. The clamps hold the material in the same plane and move apart at a specified rate of extension. A sample size of 3 inches in the cross-machine direction by 7 inches in the machine direction was selected. The grip size was 3 inches in width, and intermeshing grips were utilized so that material would not slip while tested. The grip separation was 4 inches. The samples were loaded so that the machine direction of the sample was in the vertical direction. A preload of approximately 5 to 10 grams-force was set. The samples were tested at a crosshead speed of 20 in per minute. The sample was displaced until 2000 grams-force of tension was produced, and then the test was stopped. The test reported the % elongation when 2000 grams-force of tension was produced. Results were reported as an average of three specimens and may be performed with the specimen in the cross direction (CD) and/or the machine direction (MD).

Hysteresis

The hysteresis of the elastic material was determined using a Sintech 1/S apparatus equipped with TESTWORKS software to record data. The elastomeric material was cut into strips, each having a width of three inches and a length of six inches. Both ends of the material were clamped into the opposing jaws of the apparatus, so that one inch of the length on each end of the material was maintained within the jaws and four inches of the length was available for stretching. Each material strip was stretched at a rate of 20 inches per minute to the specified elongation value in the data tables and the area under the curve (representing force X displacement) is measured and recorded as the "loading energy." The material strip is then allowed to recover to a length where the stretching force is zero. During retraction, the area under the curve is again measured and recorded. This is the "unloading energy." Hysteresis is determined according to the following equation:

$$\% \text{ Hysteresis} = \left[ \frac{\text{loading energy minus unloading energy}}{\text{loading energy}} \right] \times 100\%$$

EXAMPLE 1

The ability to form an elastic composite was demonstrated. The film used in the composite contained 90 wt % of an elastomer composition and 10 wt % of a thermoplastic composition. The elastomer composition contained 86 wt. % KRATON® MD6716 (Kraton Polymers, LLC of Houston Tex.), 10 wt. % STYRON™ 666D (Dow Chemical), and 4 wt. % Standridge Color Corporation ("SCC") 4837. KRATON® MD6716 contains approximately 75 wt. % of a styrene-ethylene-butylene-styrene ("SEBS") block copolymer, tackifier, and polyethylene wax, and has a target melt flow rate of 7 g/10 min (200° C., 5 kg). STYRON™ 666D is a polystyrene resin having a melt flow rate of 8 g/10 min (200° C., 5 kg). SCC 4837 is a pigment containing titanium dioxide blended with polyethylene. The thermoplastic composition of the film contained 59.5% PP 3155 (ExxonMobil), 31.5 wt. % DOWLEX™ 2517 (Dow Chemical), and 4 wt. % SCC 4837. PP 3155 is a polypropylene homopolymer resin having a melt flow rate of 36 g/10 min (230° C., 2.16 kg) and a density of 0.9 g/cm³. DOWLEX™ 2517 is a linear low density polyethylene resin with a melt index of 25 g/10 min (190° C., 2.16 kg), a density of 0.917 g/cm³, and a melting point of 255° F.

The composite also included two facings between which the film was sandwiched. One of the facings was a 17 gsm T-133 polypropylene bonded carded web that was oriented 5:1 in the machine to cross direction from FiberVisions of Covington, Ga. The bonded carded web had a peak load in the machine direction of about 1133 grams-force per inch and a peak load in the cross-machine direction of about 150 grams-force per inch. The other facing was a 17 gsm meltblown web formed from 60 wt. % METOCENE™ MF650W (Lyondell Basell) and 40 wt. % VISTAMAXX™ 2330 (ExxonMobil).

METOCENE™ MF650W is a metallocene-catalyzed polypropylene homopolymer having a melt flow rate of 500 g/10 min and a specific gravity of 0.88 to 0.92 g/cm$^3$. VISTAMAXX™ 2330 is a polyolefin copolymer/elastomer with a melt flow rate of 285 g/10 min and a density of 0.868 g/cm$^3$. The meltblown web had a peak load in the cross-machine direction of about 273 grams-force per inch.

The polymers for the film and meltblown layers were compounded by weighing appropriate portions of pellets of each polymer, combining them into one container, and mixing them together by stirring. After compounding, the elastomeric film was formed to a basis weight of 32 gsm using a 20" wide Randcastle co-extruding film die. The elastomeric component of the film was fed to the extruder at a spin pump speed of 7.96 rpm and a hose and die temperature of 500° F. The thermoplastic component of the film was fed to the extruder at a speed of 10.35 rpm and a hose temperature of 380° F. In this case, the thermoplastic layer was extruded in the center of the film, and the elastomer portion was extruded on either side of the thermoplastic layer to form a sandwich structure (i.e. an A-B-A film with the thermoplastic as layer B and the elastomer as layer A). The meltblown was formed in-line to a basis weight of 17 gsm using a 20" wide meltblown system having 30 capillaries per inch of die width at an air pressure of 4.5 psi, a spin pump speed of 17.3 rpm, a die height of 10.5 inches, an air temperature of 630° F., and a die temperature of 480° F. The bonded carded web was supplied from a roll and unwound into the composite forming process.

Figure 6:
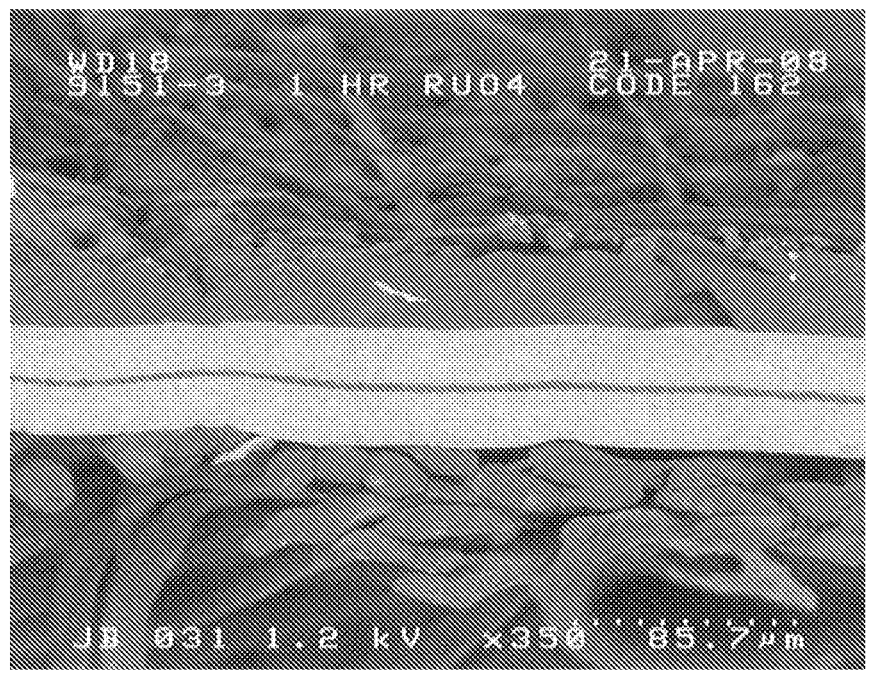
FIG. 6 is an SEM microphotograph (350x) of the composite formed in Example 1.
Figure 7:
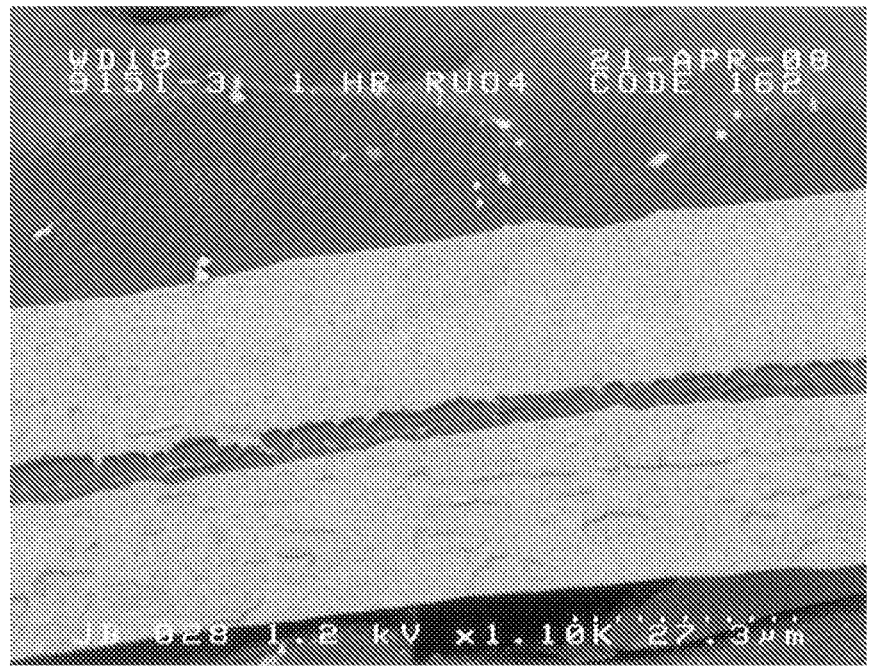
FIG. 7 is another SEM microphotograph (1,100x) of the composite formed in Example 1.

To form the composite, the meltblown web was formed on a forming wire moving at a speed of 63 feet per minute. The film was then extruded onto the meltblown web and suction forced and nipped while molten. Vacuum pressures of 1" H$_2$O to 15" H$_2$O were used for the suction application. The thermal bonded carded web was then nipped onto the film/meltblown layer while the film was still molten. The composite was then directed into a groove roll unit with 5 grooves per inch engaged at 0.252 inches. The material was then wound. Table 1 shows the resulting material properties for this material. FIGS. 6 and 7 likewise show scanning electron micrographs of the cross section of the film layer depicting the thermoplastic component in the center.

thermoplastic composition. The elastomer composition contained 86 wt. % KRATON® MD6716, 10 wt. % STYRON™ 666D, and 4 wt. % SCC 4837. The thermoplastic composition contained 48 wt. % PP 3155, 48 wt. % DOWLEX™ 2517, and 4 wt. % SCC 4837. The composite also included two facings between which the film was sandwiched. Both facings of the composite were prepared with a 17 gsm meltblown web containing 60 wt. % VALTEC™ HH441 (Lyondell-Basell) and VISTAMAXX™ 2330. VALTEC™ HH441 is an ultra-high melt flow polypropylene homopolymer resin having a melt flow rate of 440 g/10 min (230° C., 2.16 kg) and a density of 0.902 g/cm$^3$.

The polymers for the film and meltblown layers were compounded by weighing appropriate portions of pellets of each polymer, combining them into one container, and mixing them together by stirring. After compounding, the elastomeric film was formed to a basis weight of 45 gsm using a 20" wide Randcastle co-extruding film die. The elastomeric component of the film was fed to the extruder at a spin pump speed of 8.96 rpm, a hose temperature 500° F., and a die temperature of 480° F. The thermoplastic component of the film was fed to the extruder at a speed of 10.35 rpm and a hose temperature of 380° F. In this case, the elastomeric component of the film was extruded in the center of the film, and the thermoplastic component was extruded on either side of the elastomeric layer to form a sandwich structure (i.e. an A-B-A film with the thermoplastic as layer A and the elastomer as layer B). Both meltblown facings were prepared to a basis weight of 17 gsm using a 20" wide meltblown system having 30 capillaries per inch of die width at an air pressure of 4.5 psi, a spin pump speed of 17.3 rpm, a die height of 10.5 inches, an air temperature of 630° F., and a die temperature of 480° F.

To form the composite, the bottom meltblown facing was unwound onto a forming wire at 63 feet per minute. The film was then extruded onto the meltblown web and suction forced and nipped while molten. Vacuum pressures of 1" H$_2$O to 15"

TABLE 1

Material Properties

| Total Composite Basis Weight (gsm) | Film Layer Basis Weight (gsm) | Facing Basis Weights (gsm) | CD Peak Load (g$_f$ per inch) | CD Elongation at Peak (%) | CD Stretch-to-Stop (Elongation @ 2,000 g$_f$) (%) | Hysteresis at 60% elongation (%) |
|---|---|---|---|---|---|---|
| 66 | 32 | 17 | 1575 | 236 | 62 | 70 |

EXAMPLE 2

The ability to form an elastic composite was demonstrated. The film used in the composite contained approximately 90-95 wt % of an elastomer composition and 5-10 wt % of a H$_2$O were used for the suction application. The other meltblown web was then nipped onto the film/meltblown layer while the film was still molten. The composite was then directed into a groove roll unit with 5 grooves per inch engaged at 0.168 inches. The material was then wound. Table 2 shows the resulting material properties for this material.

TABLE 2

Material Properties

| Total Composite Basis Weight (gsm) | Film Layer Basis Weight (gsm) | Facing Basis Weights (gsm) | CD Peak Load (g$_f$ per inch) | CD Elongation at Peak (%) | CD Stretch-to-Stop (Elongation @ 2,000 g$_f$) (%) | Hysteresis at 27% elongation (%) |
|---|---|---|---|---|---|---|
| 79 | 45 | 17 | 2110 | 421 | 46 | 52 |

EXAMPLE 3

The ability to form an elastic composite was demonstrated. The film used in the composite contained approximately 90-95 wt % of an elastomer composition and 5-10 wt % of a thermoplastic composition. The elastomer composition contained 59.5 wt. % KRATON® MD6716, 31.5 wt. % STYRON™ 666D, and 4 wt. % SCC 4837. The thermoplastic composition contained 59.5 wt. % PP 3155, 31.5 wt. % DOWLEX™ 2517, and 4 wt. % SCC 4837. The composite also included two facings between which the film was sandwiched. The facings were the same as those used in Example 1.

The polymers for the film and meltblown layers were compounded by weighing appropriate portions of pellets of each polymer, combining them into one container, and mixing them together by stirring. After compounding, the elastomeric film was formed to a basis weight of 44 gsm using a 20" wide Randcastle co-extruding film die. The elastomeric component of the film was fed to the extruder at a spin pump speed of 7.96 rpm, a hose temperature of 500° F., and a die temperature of 480° F. The thermoplastic component of the film was fed to the extruder at a speed of 10.35 rpm and a hose temperature of 380° F. In this case, the elastomeric layer was extruded in the center of the film, and the thermoplastic component was extruded on either side of the elastomeric layer to form a sandwich structure (i.e. an A-B-A film with the elastomer as layer B and the thermoplastic as layer A). The bonded carded web was supplied from a roll and unwound into the composite forming process. The meltblown was formed to a basis weight of 17 gsm using a 20" wide meltblown system having 30 capillaries per inch of die width at an air pressure of 2 psi, a spin pump speed of 17.3 rpm, a die height of 10.5 inches, an air temperature of 630° F., and a die temperature of 480° F.

To form the composite, the meltblown web was formed on a forming wire moving at a speed of 63 feet per minute. The film was then extruded onto the meltblown web and suction forced and nipped while molten. Vacuum pressures of 1" H$_2$O to 15" H$_2$O were used for the suction application. The other meltblown web was then nipped onto the film/meltblown layer while the film was still molten. The composite was then directed into a groove roll unit with 5 grooves per inch engaged at 0.168 inches. The material was then wound. Table 3 shows the resulting material properties for this material.

EXAMPLE 4

The ability to form an elastic composite was demonstrated. The film used in the composite contained 100 wt. % of an elastomer composition. The elastomer composition contained 86 wt. % KRATON® MD6716, 10 wt. % STYRON™ 666D, and 4 wt. % SCC 4837. The composite also included two facings between which the film was sandwiched. One of the facings was the bonded carded web of Example 1. The other facing was a 17 gsm meltblown web formed from 60 wt. % DNDA 1082 NT-7 (Dow Chemical) and 40 wt. % VISTAMAXX™ 2330. DNDA 1082 NT-7 is a linear low density polyethylene resin with a melt index of 155 g/10 min (190° C., 2.16 kg), a density of 0.933 g/cm$^3$, and a melting point of 257° F. The meltblown web had a peak load in the cross-machine direction of about 113 grams-force per inch.

The polymers for the film and meltblown layer were compounded by weighing appropriate portions of pellets of each polymer, combining them into one container, and mixing them together by stirring. After compounding, the elastomeric film was formed to a basis weight of 46 gsm using a 20" wide Randcastle co-extruding film die. The elastomeric film was fed to the extruder at a spin pump speed of 7.96 rpm, hose temperature of 500° F., and a die temperature of 480° F. The bonded carded web was supplied from a roll and unwound into the composite forming process. The meltblown web was formed to a basis weight of 17 gsm using a 20" wide meltblown system having 30 capillaries per inch of die width at an air pressure of 4.5 psi, a spin pump speed of 17.3 rpm, a die height of 10.5 inches, an air temperature of 630° F., and a die temperature of 480° F.

To form the composite, the meltblown web was formed on a forming wire going 63 feet per minute. The film was then extruded onto the meltblown web and suction forced and nipped while molten. Vacuum pressures of 1" H$_2$O to 15" H$_2$O were used for the suction application. The thermal bonded carded web was then nipped onto the film/meltblown layer while the film was still molten. The composite was then directed into a groove roll unit with 5 grooves per inch engaged at 0.224 inches. The material was then wound. Table 4 shows the resulting material properties for this material.

TABLE 3

Material Properties

| Total Composite Basis Weight (gsm) | Film Layer Basis Weight (gsm) | Facing Basis Weights (gsm) | CD Peak Load (g$_f$ per inch) | CD Elongation at Peak (%) | CD Stretch-to-Stop (Elongation @ 2,000 g$_f$) (%) | Hysteresis at 78% elongation (%) |
|---|---|---|---|---|---|---|
| 78 | 44 | 17 | 1809 | 386 | 92 | 59 |

TABLE 4

| Total Composite Basis Weight (gsm) | Film Layer Basis Weight (gsm) | Facing Basis Weights (gsm) | CD Peak Load (g$_f$ per inch) | CD Elongation at Peak (%) | CD Stretch-to-Stop (Elongation @ 2,000 g$_f$) (%) | Hysteresis at 85% elongation (%) |
|---|---|---|---|---|---|---|
| 80 | 46 | 17 | 1615 | 464 | 306 | 40 |

EXAMPLE 5

The ability to form an elastic composite was demonstrated. The film was formed as described in Example 1. The composite also included two facings between which the film was sandwiched. Both facings were bonded carded webs as described in Example 1. The polymers for the film and nonwoven layers were compounded by weighing appropriate portions of pellets of each polymer, combining them into one container, and mixing them together by stirring. After compounding, the elastomeric film was formed to a basis weight of 49 gsm using a 20" wide Randcastle co-extruding film die. The elastomeric component of the film was fed to the extruder at a spin pump speed of 8.96 rpm, hose temperature of 500° F., and a die temperature of 480° F. The thermoplastic component of the film was fed to the extruder at a speed of 10.35 rpm and a hose temperature of 380° F. In this case, the elastomeric layer was extruded in the center of the film, and the thermoplastic component was extruded on either side of the elastomeric layer to form a sandwich structure (i.e. an A-B-A film with the elastomer as layer B and the thermoplastic as layer A). The bonded carded web was supplied from a roll and unwound into the composite forming process.

To form the composite, the bottom thermal bonded carded web facing was formed on a forming wire going 63 feet per minute. The film was then extruded onto the web and suction forced and nipped while molten. Vacuum pressures of 1" H$_2$O to 15" H$_2$O were used for the suction application. The other thermal bonded carded web was then nipped onto the film/bonded carded layer while the film was still molten. The composite was then directed into a groove roll unit with 5 grooves per inch engaged at 0.168 inches. The material was then wound. Table 5 shows the resulting material properties for this material.

TABLE 5

| Total Composite Basis Weight (gsm) | Film Layer Basis Weight (gsm) | Facing Basis Weights (gsm) | CD Peak Load (g$_f$ per inch) | CD Elongation at Peak (%) | CD Stretch-to-Stop (Elongation @ 2,000 g$_f$) (%) | Hysteresis at 38% elongation (%) |
|---|---|---|---|---|---|---|
| 83 | 49 | 17 | 1811 | 451 | 101 | 37 |

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method of forming a composite, the method comprising:

extruding an elastomeric composition directly onto a surface of a nonwoven facing to form an elastic film, wherein the nonwoven facing has a basis weight of about 45 grams per square meter or less and a peak load of about 350 grams-force per inch or less in the cross-machine direction; and allowing the film to bond to the nonwoven facing to form a composite, wherein the composite exhibits a peak elongation of about 75% or more in the machine direction, cross-machine direction, or both, wherein the elastomeric composition is co-extruded in conjunction with a thermoplastic composition so that the elastomeric composition forms an elastic layer positioned adjacent to the surface of the nonwoven facing and the thermoplastic composition forms a thermoplastic layer positioned adjacent to the elastic layer.

2. The method of claim 1, wherein the nonwoven facing has a basis weight of from about 2 to about 20 grams per square meter.

3. The method of claim 1, wherein the nonwoven facing has a peak load of from about 50 to about 300 grams-force per inch in the cross-machine direction.

4. The method of claim 1, wherein the nonwoven facing has a peak load of about 3000 grams-force per inch or less in the machine direction.

5. The method of claim 1, wherein the composite exhibits a peak elongation of from about 150% to about 500% in the machine direction, the cross-machine direction, or both.

6. The method of claim 1, wherein the nonwoven facing is formed from a composition that contains a polyolefin.

7. The method of claim 1, wherein about 55 wt. % or more of the polymer content of the elastomeric composition is constituted by at least one substantially amorphous elastomer.

8. The method of claim 7, wherein the elastomer includes styrene-butadiene, styrene-isoprene, styrene-butadiene-styrene, styrene-isoprene-styrene, styrene-(ethylene-butylene), styrene-(ethylene-propylene), styrene-(ethylene-butylene)-styrene, styrene-(ethylene-propylene)-styrene, styrene-(ethylene-butylene)-styrene-(ethylene-butylene), styrene-(ethylene-propylene)-styrene-(ethylene-propylene), and styrene-ethylene-(ethylene-propylene)-styrene, or a combination thereof.

9. The method of claim 1, wherein polyolefins constitute about 55 wt. % or more of the polymer content of the thermoplastic composition.

10. The method of claim 1, further comprising applying a suctional force to bias the film toward the surface of the nonwoven facing.

11. The method of claim 10, wherein a pneumatic vacuum pressure is employed to apply the suctional force.

12. The method of claim 11, wherein the pressure is from 0.3 to about 5 kilopascals.

13. The method of claim 1, further comprising stretching the composite in the machine direction, the cross-machine direction, or both.

14. The method of claim 13, wherein the composite is stretched in the cross-machine direction to a width that is from about 100% to about 750% of its width prior to stretching.

15. The method of claim 1, wherein the composite is passed through grooved rolls that incrementally stretch the composite in the cross-machine direction.

16. The method of claim 1, wherein the nonwoven facing is a meltblown facing.

17. The method of claim 1, further comprising laminating an additional nonwoven facing to the film so that the film is positioned between the nonwoven facing and the additional nonwoven facing.

* * * * *